(12) United States Patent
Sato

(10) Patent No.: US 11,019,236 B2
(45) Date of Patent: May 25, 2021

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Hideo Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/895,768

(22) Filed: Feb. 13, 2018

(65) Prior Publication Data

US 2018/0176422 A1 Jun. 21, 2018

Related U.S. Application Data

(63) Continuation of application No. 15/002,196, filed on Jan. 20, 2016, now Pat. No. 9,924,075, which is a (Continued)

(30) Foreign Application Priority Data

Nov. 29, 2012 (JP) ................................ 2012-261308

(51) Int. Cl.
*H04N 1/00* (2006.01)
*H04N 1/60* (2006.01)
(Continued)

(52) U.S. Cl.
CPC ......... *H04N 1/6097* (2013.01); *G06K 15/027* (2013.01); *G06K 15/129* (2013.01); (Continued)

(58) Field of Classification Search
None
See application file for complete search history.

(56) References Cited

U.S. PATENT DOCUMENTS 5,185,673 A * 2/1993 Sobol ................... H04N 1/4078
358/1.9
5,333,068 A * 7/1994 Sakai ..................... G03G 15/01
358/500
(Continued)

FOREIGN PATENT DOCUMENTS

| CN | 102019775 A | 4/2011 |
|---|---|---|
| CN | 102073235 A | 5/2011 |

(Continued)

*Primary Examiner* — Anh-Vinh T Nguyen
(74) *Attorney, Agent, or Firm* — Canon U.S.A., Inc. IP Division

(57) ABSTRACT

An image processing apparatus includes a control unit configured to control execution of monochromatic calibration and multi-color calibration, and a registration unit configured to register paper types of paper to be used at time of execution of the monochromatic calibration, a monochromatic target value set for each of the paper types used for the monochromatic calibration, paper types of paper to be used at time of execution of multi-color calibration, and a multi-color target value set for each of the paper types used for the multi-color calibration. The image processing apparatus executes the multi-color calibration, after executing the monochromatic calibration, via the control unit by using paper of a paper type selected from common paper types out of the registered paper types and the monochromatic target value and the multi-color target value set for the selected paper type.

14 Claims, 20 Drawing Sheets

Related U.S. Application Data continuation of application No. 14/091,905, filed on Nov. 27, 2013, now Pat. No. 9,300,816.

(51) Int. Cl.
 *G06K 15/02* (2006.01)
 *G06K 15/12* (2006.01)

(52) U.S. Cl.
 CPC ..... *G06K 15/1868* (2013.01); *H04N 1/00034* (2013.01); *H04N 1/00087* (2013.01); *H04N 1/00092* (2013.01); *H04N 1/6038* (2013.01); *H04N 2201/0094* (2013.01)

(56) References Cited

U.S. PATENT DOCUMENTS

| | | | | |
|---|---|---|---|---|
| 5,363,318 A * | 11/1994 | McCauley | .......... | H04N 1/6027 348/E17.005 |
| 5,649,073 A * | 7/1997 | Knox | .......... | H04N 1/405 358/1.9 |
| RE38,180 E * | 7/2003 | Edge | .......... | H04N 1/40006 347/115 |
| 6,788,431 B1 * | 9/2004 | Yamaguchi | .......... | G03F 9/00 358/1.9 |
| 6,819,451 B1 * | 11/2004 | Start | .......... | H04N 1/40006 345/178 |
| 7,097,270 B2 | 8/2006 | Yamazaki | | |
| 7,271,935 B2 * | 9/2007 | Coons | .......... | G03G 15/5062 358/1.9 |
| 7,433,029 B1 * | 10/2008 | Hsu | .......... | G01B 11/26 356/141.5 |
| 8,368,762 B1 * | 2/2013 | Chen | .......... | H04N 17/002 348/187 |
| 8,896,892 B2 * | 11/2014 | Wen | .......... | H04N 1/6033 358/474 |
| 9,124,747 B2 * | 9/2015 | Kawanishi | .......... | H04N 1/00042 |
| 2003/0085941 A1 * | 5/2003 | Tezuka | .......... | G03G 15/5062 347/19 |
| 2003/0103104 A1 * | 6/2003 | Kushner | .......... | D06P 5/30 347/43 |
| 2003/0164955 A1 * | 9/2003 | Vinas | .......... | B41J 11/008 358/1.2 |
| 2004/0212816 A1 * | 10/2004 | Tanabe | .......... | H04N 1/6033 358/1.9 |
| 2005/0069220 A1 * | 3/2005 | Czyszczewski | .......... | H04N 1/58 382/275 |
| 2005/0083540 A1 * | 4/2005 | Hersch | .......... | H04N 1/6025 358/1.9 |
| 2005/0117925 A1 * | 6/2005 | Tanaka | .......... | G03G 15/01 399/49 |
| 2005/0117926 A1 * | 6/2005 | Tanaka | .......... | G03G 15/0126 399/49 |
| 2005/0190407 A1 * | 9/2005 | Yokoyama | .......... | H04N 1/40 358/2.1 |
| 2005/0224704 A1 * | 10/2005 | Yamaguchi | .......... | G03B 11/00 250/226 |
| 2005/0248786 A1 * | 11/2005 | Tobie | .......... | H04N 1/6033 358/1.9 |
| 2006/0197966 A1 * | 9/2006 | Viturro | .......... | H04N 1/6055 358/1.9 |
| 2006/0227397 A1 * | 10/2006 | Goma | .......... | H04N 1/6033 358/521 |
| 2007/0025612 A1 * | 2/2007 | Iwasaki | .......... | G01B 11/25 382/154 |
| 2007/0229923 A1 * | 10/2007 | Itagaki | .......... | H04N 1/00002 358/504 |
| 2007/0273942 A1 | 11/2007 | Miyata | | |
| 2008/0007172 A1 * | 1/2008 | Tan | .......... | C09K 11/7731 313/512 |
| 2008/0137110 A1 | 6/2008 | Mestha et al. | | |
| 2008/0137150 A1 * | 6/2008 | Wang | .......... | H04N 1/00002 358/406 |
| 2008/0239344 A1 * | 10/2008 | Wang | .......... | B41J 29/393 358/1.9 |
| 2008/0239400 A1 * | 10/2008 | Yoshida | .......... | H04N 1/00002 358/3.01 |
| 2009/0027730 A1 | 1/2009 | Monga et al. | | |
| 2009/0067007 A1 | 3/2009 | Ishida | | |
| 2009/0141295 A1 * | 6/2009 | Hayashi | .......... | H04N 1/6033 358/1.9 |
| 2009/0296106 A1 * | 12/2009 | Donaldson | .......... | H04N 1/603 358/1.9 |
| 2010/0111370 A1 * | 5/2010 | Black | .......... | G06K 9/00369 382/111 |
| 2010/0182649 A1 * | 7/2010 | Monga | .......... | H04N 1/4078 358/3.06 |
| 2010/0207938 A1 * | 8/2010 | Yau | .......... | G06T 1/0007 345/419 |
| 2010/0207972 A1 | 8/2010 | Kawai | | |
| 2010/0328688 A1 * | 12/2010 | Sakamoto | .......... | H04N 1/6052 358/1.9 |
| 2011/0065031 A1 | 3/2011 | Nakase | | |
| 2012/0081755 A1 * | 4/2012 | Monga | .......... | H04N 1/6033 358/3.06 |
| 2012/0133961 A1 * | 5/2012 | Henderson | .......... | G06K 15/027 358/1.9 |
| 2013/0038886 A1 * | 2/2013 | Kondo | .......... | H04N 1/6097 358/1.9 |
| 2013/0169994 A1 * | 7/2013 | Omagari | .......... | G06K 15/00 358/2.1 |
| 2013/0235430 A1 * | 9/2013 | Sakatani | .......... | G06K 15/129 358/3.23 |
| 2013/0321514 A1 * | 12/2013 | Pous | .......... | B41J 29/393 347/19 |
| 2014/0016149 A1 * | 1/2014 | Matsuzaki | .......... | G06K 15/1878 358/1.9 |
| 2014/0043476 A1 * | 2/2014 | Stark | .......... | G06T 7/90 348/143 |
| 2014/0146331 A1 * | 5/2014 | Sato | .......... | H04N 1/6097 358/1.9 |
| 2014/0160498 A1 * | 6/2014 | Yano | .......... | G06F 3/1208 358/1.9 |
| 2014/0253686 A1 * | 9/2014 | Wong | .......... | H04N 13/286 348/46 |
| 2014/0253931 A1 * | 9/2014 | Hashizume | .......... | H04N 1/50 358/1.9 |
| 2015/0172514 A1 * | 6/2015 | Komatsu | .......... | H04N 1/6077 358/504 |
| 2015/0235114 A1 * | 8/2015 | Kubota | .......... | G01N 21/278 358/1.9 |
| 2016/0216636 A1 * | 7/2016 | Itagaki | .......... | G03G 15/04027 |
| 2017/0048423 A1 * | 2/2017 | Itagaki | .......... | H04N 1/00034 |

FOREIGN PATENT DOCUMENTS

| | | |
|---|---|---|
| JP | 2002123055 A | 4/2002 |
| JP | 2007-272112 A | 10/2007 |
| JP | 2011-254350 A | 12/2011 |

* cited by examiner

FIG.15

| MONOCHROMATIC CALIBRATION PAPER | MULTI-COLOR CALIBRATION PAPER |
|---|---|
| PLAIN PAPER A | PLAIN PAPER A |
| THICK PAPER | PLAIN PAPER B |
| COATED PAPER | COATED PAPER |

FIG.17

| CASSETTE | SIZE | PAPER |
|---|---|---|
| 1 | A3 | PLAIN PAPER A |
| 3 | A3 | COATED PAPER |

CONTINUOUS CALIBRATION

1701

1602 — EXECUTE

IMAGE PROCESSING APPARATUS, IMAGE PROCESSING METHOD, AND PROGRAM

CROSS REFERENCE TO RELATED APPLICATIONS

The present application is a Continuation of U.S. patent application Ser. No. 15/002,196 filed Jan. 20, 2016, which is a Continuation of U.S. patent application Ser. No. 14/091,905 filed Nov. 27, 2013, now U.S. Pat. No. 9,300,816, which claims the benefit of priority from Japanese Patent Application No. 2012-261308 filed Nov. 29, 2012, each of which is hereby incorporated by reference herein in their entirety.

BACKGROUND OF THE INVENTION

Field of the Invention

The present invention relates to an image processing apparatus for correcting the color of an image output from a printer, an image processing method therefor, and a program for generating image processing parameters.

Description of the Related Art

With the improved performance of electrophotographic apparatuses in recent years, some electrophotographic apparatuses have achieved an image quality equivalent to that of a printing machine. However, there remains a problem that such electrophotographic apparatuses have a larger color variation amount than that of a printing machine because of the instability specific to the electrophotographic process. Therefore, conventional electrophotographic apparatuses employ various calibration techniques.

To correct primary colors, a conventional electrophotographic apparatus employs a calibration technique for generating a look up table (LUT) for correcting one-dimensional (1D) gradation corresponding to the cyan, magenta, yellow, and black toners. The LUT refers to a table indicating output data corresponding to input data delimited at specific intervals. The LUT enables expressing nonlinear characteristics that cannot be represented by arithmetic formulas. A color produced by using each of the C, M, Y, and K toners is referred to as "monochromatic color". Performing "monochromatic" calibration enables correcting the monochromatic color reproduction characteristics, such as a maximum density and a gradation.

In recent years, Japanese Patent Application Laid-Open No. 2011-254350 discusses a technique for performing "multi-color" calibration by using a four-dimensional (4D) LUT. "Multi-color" means a color produced by a plurality of color toners. For example, the red, green, and blue colors are produced by using two out of the C, M, and Y colors. The gray color is produced by using the C, M, and Y colors. Particularly with electrophotography, expressing "multi-color" by using a plurality of color toners often produces a nonlinear difference even if the monochromatic gradation characteristics are corrected by using a one-dimensional LUT. In this case, executing multi-color calibration enables correcting the color reproduction characteristics of a multi-color expressed in combination (superposition) of a plurality of color toners.

The following describes a flow of calibration including "multi-color" calibration. First of all, to execute "monochromatic" calibration, a patch image is printed on a recording medium, such as paper, by using monochromatic chart data. This patch image having a single density and a predetermined area is used for measurement. When a plurality of patch images having different colors is generated and printed on a recording medium, these path images are collectively referred to as a pattern image. The recording medium, such as paper, on which the pattern image is printed is read by using a scanner or a sensor to read the patch images. Data obtained by reading the patch images is compared with a preset target value to generate a one-dimensional (1D) LUT for correcting the difference from the target value. Then, to execute "multi-color" calibration, patch images are printed on a recording medium by using multi-color chart data reflecting the 1D LUT generated previously, and then the patch images are read by using a scanner or a sensor. Data obtained by reading the patch images is compared with a preset target value to generate a four-dimensional (4D) LUT for correcting the difference from the target value.

As described above, high-precision correction is feasible by correcting through "multi-color" calibration the multi-color characteristics which cannot be corrected only through "monochromatic" calibration.

A result of calibration is affected if the density and color of toner applied to paper is change by the type of the sheet (paper type). Therefore, it is important to associate the paper type with the target value preset for each paper type. Japanese Patent Application Laid-Open No. 2007-272112 discusses a technique for selecting paper at the time of execution of each calibration, selecting internal parameters suitable for the selected sheet, and executing calibration.

With the conventional technique, paper to be used is separately optimized at the time of execution of each calibration. When a plurality of calibrations for different correction targets is executed, such as monochromatic calibration and multi-color calibration, it is necessary to select paper types to be used before execution of each calibration, or to select a sheet feed stage storing paper belonging to the selected paper type. The user needs to make setting in this way before execution of each calibration. As a result, workloads on user operations increase causing a problem that user's intervention cannot be reduced in calibration processing.

Although the target value used for correction in monochromatic calibration differs for each paper type, calibration may be performed, in some cases, so that the density ratio in halftone and maximum density value becomes constant for each paper type. In this case, since the applied toner amount corresponding to an output signal differs for each paper type, the applied toner amount required to output a certain color image differs for each paper type.

Specifically, after execution of monochromatic calibration by using different paper, a different color is output since a correction table differs for each paper type.

Under this condition, a target value for multi-color calibration is registered. To register a target value at the time of execution of multi-color calibration, a toner image actually printed on paper is measured, and the result of the measurement is registered as a target value.

Since this target value for multi-color calibration is registered after execution of monochromatic calibration, the target value differs for each type of paper which has been used at the time of execution of monochromatic calibration.

For example, when an image processing apparatus supporting paper types A and B performs monochromatic calibration by using paper of the paper type A, the apparatus outputs an image by using a correction table A.

In multi-color calibration executed in this case, the apparatus uses a selected one of two different target values (a target value A1 registered by using paper of the paper type A and a target value B1 registered by using paper of the paper type B).

On the other hand, when the same image processing apparatus performs monochromatic calibration by using paper of the paper type B, the apparatus outputs an image by using a correction table B which is different from the correction table A. Therefore, since color correction is performed by using a different correction table from the one previously used, the apparatus also needs to change the target value.

Therefore, in multi-color calibration executed in this case, the apparatus uses a selected one of two different target values (a target value A2 registered by using paper of the paper type A and a target value B2registered by using paper of the paper type B).

Specifically, a plurality of target values for multi-color calibrations is required for each paper type of paper that has been used for monochromatic calibration.

As described above, if two different paper types are usable at the time of execution of monochromatic calibration and at the time of execution of multi-color calibration, there are two different target values for the paper types for multi-color calibrations corresponding to each of the two different types of paper for monochromatic calibration. Specifically, a total of four different target values are required for multi-color calibration.

Registering a plurality of target values for multi-color calibrations for each paper type used at the time of execution of monochromatic calibration takes time and effort in this way, resulting in complicated processing.

Therefore, it is desired to conform a paper type of paper to be used at the time of execution of monochromatic calibration to a paper type of paper to be used at the time of execution of multi-color calibration.

SUMMARY OF THE INVENTION

According to an aspect of the present invention, an image processing apparatus includes an image forming unit configured to form an image, a colorimetry unit configured to perform colorimetry on the image formed by the image forming unit, a control unit configured to control execution of monochromatic calibration in which the colorimetry unit performs colorimetry on a monochromatic image formed on paper by the image forming unit by using a monochromatic recording agent, and the image forming unit corrects reproduction characteristics of a monochromatic image formed on paper of the same paper type as the paper having the monochromatic image formed thereon, based on a result of the colorimetry and a monochromatic target value set for the paper type of the paper having the monochromatic image formed thereon, and to control execution of multi-color calibration in which the colorimetry unit performs colorimetry on a multi-color image formed on paper by the image forming unit by using a plurality of color recording agents, and the image forming unit corrects reproduction characteristics of a multi-color image formed on paper of the same paper type as the paper having the multi-color image formed thereon, based on a result of the colorimetry and a multi-color target value set for the paper type of the paper having the multi-color image formed thereon, a registration unit configured to register paper types of paper on which a monochromatic image is to be formed by execution of the monochromatic calibration, a monochromatic target value set for each of the paper types used for the monochromatic calibration, paper types of paper on which a multi-color image is to be formed by execution of the multi-color calibration, and a multi-color target value set for each of the paper types used for the multi-color calibration, and a selection unit configured to select a paper type out of paper types common to the paper types of paper on which a monochromatic image is to be formed by execution of the monochromatic calibration registered by the registration unit and to the paper types of paper on which a multi-color image is to be formed by execution of the multi-color calibration registered by the registration unit. The image processing apparatus executes the multi-color calibration, after executing the monochromatic calibration, via the control unit by using paper belonging to the paper type selected by the selection unit and the monochromatic target value and the multi-color target value set for the selected paper type.

According to exemplary embodiments of the present invention, in the case of continuous execution of a plurality of calibrations for different correction targets, it becomes easier to conform a paper type of paper to be used at the time of execution of monochromatic calibration to a paper type of paper to be used at the time of execution of multi-color calibration. This eliminates the need of registering a plurality of target values for multi-color calibration.

According to exemplary embodiments of the present invention, it becomes possible to select through one piece of processing a sheet feed stage storing a paper type or paper belonging to the relevant paper type. Specifically, one paper type to be used at the time of execution of a plurality of calibrations can be selected through single paper selection.

Accordingly, in the case of continuous execution of a plurality of calibrations for different correction targets, a calibration execution instruction can be received from the user with reduced processing.

Thus, user's workloads can be reduced to reduce user's intervention when instructing calibration execution.

Further features of the present invention will become apparent from the following description of exemplary embodiments with reference to the attached drawings.

BRIEF DESCRIPTION OF THE DRAWINGS

FIG. 15 illustrates an example of paper types registered for each calibration.

FIG. 17 illustrates another example of a sheet feed stage selection screen according to the first exemplary embodiment.

DESCRIPTION OF THE EMBODIMENTS

Various exemplary embodiments, features, and aspects of the invention will be described in detail below with reference to the drawings.

Figure 1:
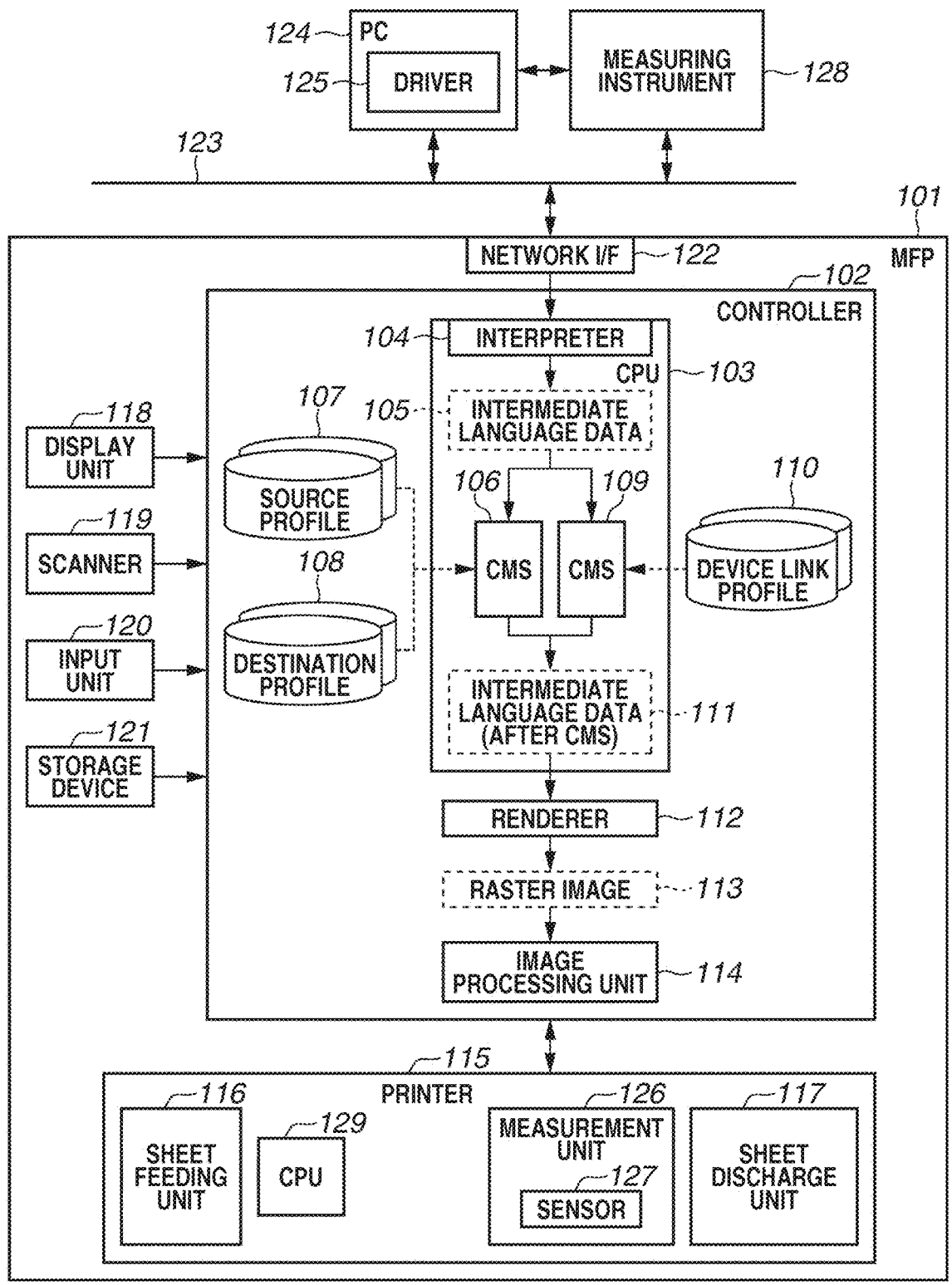
FIG. 1 illustrates a configuration of a multifunction peripheral (MFP) according to an exemplary embodiment.

FIG. 1 is a block diagram illustrating a system according to an exemplary embodiment. A multifunction peripheral (MFP) 101, which is a color image processing apparatus using cyan, magenta, yellow, and black (C, M, Y, and K) toners, is connected with other network-based apparatuses via a network 123. A personal computer (PC) 124 is connected with the MFP 101 via the network 123. A printer driver 125 in the PC 124 transmits print data to the MFP 101.

The MFP 101 will be described in detail below. A network interface (I/F) 122 receives print data. A controller 102 includes a central processing unit (CPU) 103, a renderer 112, and an image processing unit 114. An interpreter 104 of the CPU 103 interprets a page description language (PDL) portion of the received print data to generate intermediate language data 105.

A color management system (CMS) 106 performs color conversion by using a source profile 107 and a destination profile 108 to generate intermediate language data (after CMS) 111. The CMS 106 performs color conversion by using profile information (described below). The source profile 107 is a profile for converting a device-dependent color space, such as RGB and CMYK, into a device-independent color space, such as L*a*b* (hereinafter referred to as Lab) prescribed by the International Commission on Illumination (CIE) or XYZ. XYZ, a device-independent color space similar to Lab, represents color with three different stimulus values. The destination profile 108 is a profile for converting a device-independent color space into the CMYK color space dependent on a device (a printer 115).

On the other hand, a CMS 109 performs color conversion by using a device link profile 110 to generate intermediate language data (after CMS) 111. The device link profile 110 is a profile for directly converting a device-dependent color space, such as RGB and CMYK, into the CMYK color space dependent on a device (the printer 115). Which of the CMS 106 and the CMS 109 is selected depends on a setting in the printer driver 125.

Although, in the present exemplary embodiment, a plurality of CMS's (the CMS's 106 and 109) are used for a plurality of types of profiles (the profiles 107, 108, and 110), the configuration is not limited thereto. A plurality of types of profiles may be handled by one CMS. Further, types of profiles are not limited to those in the present exemplary embodiment. Any types of profiles may be used as long as the CMYK color space dependent on a device (the printer 115) is used.

The renderer 112 generates a raster image 113 based on the generated intermediate language data (after CMS) 111. The image processing unit 114 executes image processing on the raster image 113 and an image read by a scanner 119. The image processing unit 114 will be described in detail below.

The printer 115 connected with the controller 102 forms on paper a color image based on output data by using the C, M, Y, and K color toners. The printer 115 includes a sheet feeding unit 116 for feeding a sheet, a sheet discharge unit 117 for discharging a sheet having an image formed thereon, and a measurement unit 126.

The measurement unit 126 includes a sensor 127 (a colorimetry portion) capable of acquiring the spectral reflectance and values of a device-independent color space, such as Lab and XYZ, and is controlled by the CPU 129, which controls the printer 115. The measurement unit 126 measures a patch image printed on a recording medium, such as paper, by the printer 115.

The measurement unit 126 may be a sensor (hereinafter referred to as a post-fixing sensor) for measuring the patch image which has been fixed on paper. The measurement unit 126 is disposed on a sheet conveyance path between sheet fixing and sheet discharge in the printer 115, and reads an output chart image. Therefore, the use of the sensor 127 disposed in the printer 115 enables reading a chart image without user's intervention during measurement.

The patch image having a single density and a predetermined area is used for measurement. When a plurality of patch images having different colors is generated, and the generated patch images are printed on a recording medium, the path images are collectively referred to as a pattern image. The sensor 127 included in the measurement unit 126 reads the pattern image, and transmits read numerical information to the controller 102. The controller 102 executes calculation by using relevant numerical information, and utilizes the result of the calculation at the time of execution of monochromatic calibration and multi-color calibration.

A display unit 118 is a user interface (UI) for displaying an instruction to a user and the status of the MFP 101. The display unit 118 is utilized at the time of execution of monochromatic calibration and multi-color calibration (described below).

The scanner 119 includes an automatic document feeder. The scanner 119 irradiates an image on a bundle of document sheets or a one document sheet with light from a light source (not illustrated), and focuses an image reflected by a document sheet on a solid-state image sensor, such a charge-coupled device (CCD) sensor, through a lens. Then, the scanner 119 obtains a raster-form image read signal as image data from the solid-state image sensor.

An input unit 120 is an interface for receiving an input from the user. A part of the input unit 120 may be a touch panel, and integrated with the display unit 118.

A storage device 121 stores data processed by the controller 102 and data received by the controller 102.

A measuring unit 128 is an external measurement unit connected to the network 123 or the PC 124. Similar to the measurement unit 126, the measuring unit 128 is able to acquire the spectral reflectance and values of a device-independent color space, such as Lab and XYZ.

Figure 2:
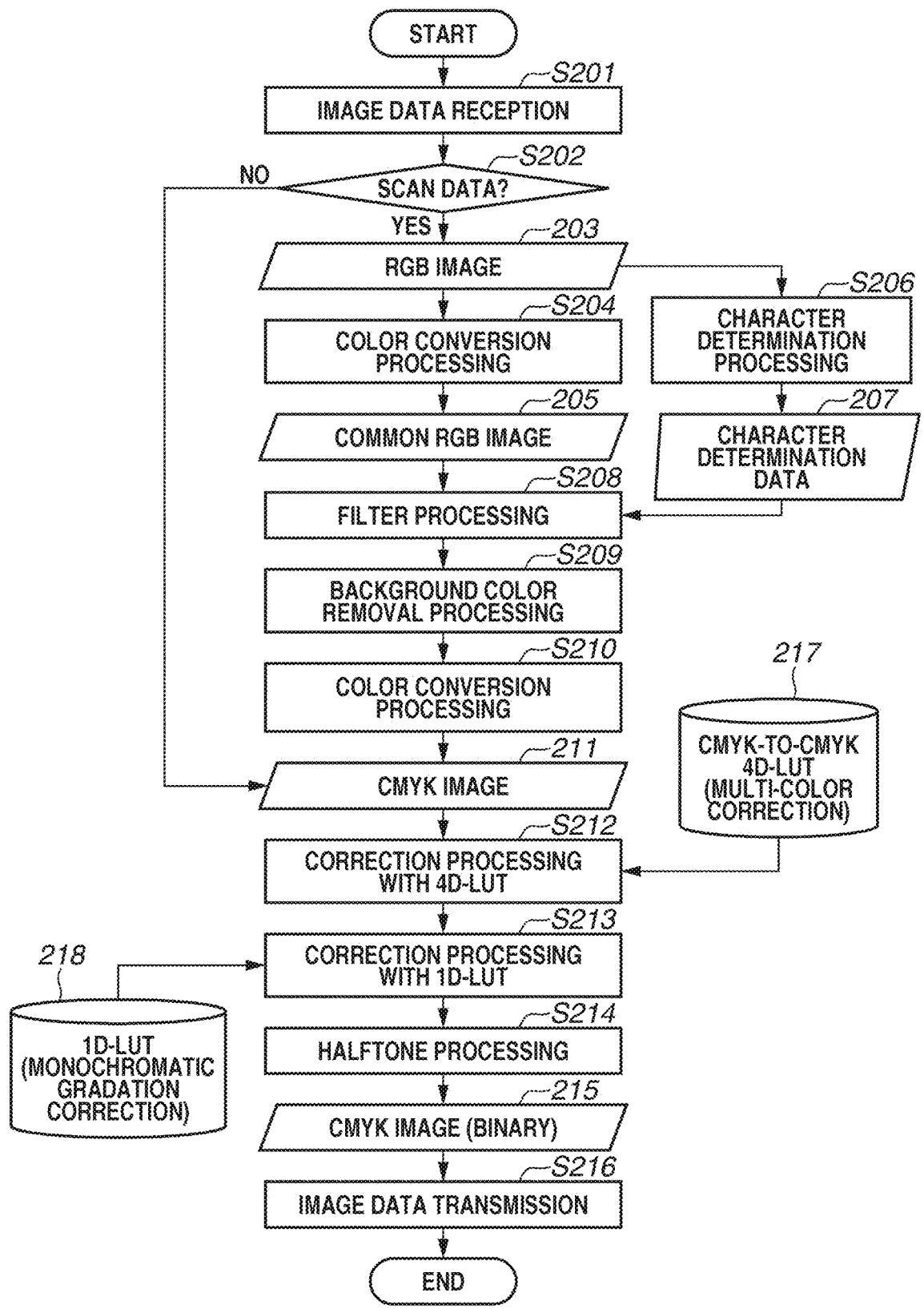
FIG. 2 illustrates a configuration of an image processing unit according to an exemplary embodiment.

Processing executed by the image processing unit 114 will be described below. FIG. 2 is a flowchart illustrating image processing to be performed on the raster image 113 and an image read by the scanner 119. The processing of the flowchart illustrated in FIG. 2 is implemented when an application-specific integrated circuit (ASIC) (not illustrated) in the image processing unit 114 executes each step.

In step S201, the image processing unit 114 receives image data. The image processing unit 114 determines whether the received data is scan data received from the scanner 119 or the raster image 113 sent from the printer driver 125.

When the received data is determined not to be scan data (NO in step S202), then in step S211, the received data is the raster image 113 rasterized in bitmap form by the renderer 112, and the CMS converts the received data into a CMYK image 211 dependent on a printer device.

When the received data is determined to be scan data, i.e., an RGB image 203 (YES in step S202), then in step S204, the image processing unit 114 executes color conversion processing to generate a common RGB image 205. The common RGB image 205 is defined in the device-independent RGB color space, and can be converted into a device-independent color space, such as Lab, through calculation.

In step S206, on the other hand, the image processing unit 114 executes character determination processing to generate character determination data 207 by detecting, in this case, edges of the image.

In step S208, the image processing unit 114 executes filter processing on the common RGB image 205 by using the character determination data 207. The image processing unit 114 executes different filter processing on the character portion and on other portions, by using the character determination data 207.

In step S209, the image processing unit 114 executes background color removal processing. In step S210, the image processing unit 114 executes color conversion processing to generate the CMYK image 211.

In step S212, the image processing unit 114 executes multi-color correction processing by using a 4D-LUT 217. A 4D-LUT refers to a four-dimensional look up table (LUT) for converting a combination of signal values when outputting the C, M, Y, and K toners into a combination of C, M, Y, and K signal values. The 4D-LUT 217 is generated by "multi-color calibration" (described below). The use of the 4D-LUT enables correcting "multi-color" using a plurality of toners.

After completion of the multi-color correction processing in step S212, in step S213, the image processing unit 114 corrects the gradation characteristics for each of the C, M, Y, and K monochromatic colors by using a 1D-LUT 218. A 1D-LUT refers to a one-dimensional look up table (LUT) for correcting each of the C, M, Y, and K monochromatic colors. The 1D-LUT 218 is generated by "monochromatic calibration" described below.

In step S214, the image processing unit 114 executes halftone processing, such as screen processing and error diffusion processing, to generate a CMYK image (binary) 215. In step S216, the image processing unit 114 transmits the image data to the printer 115.

Figure 3:
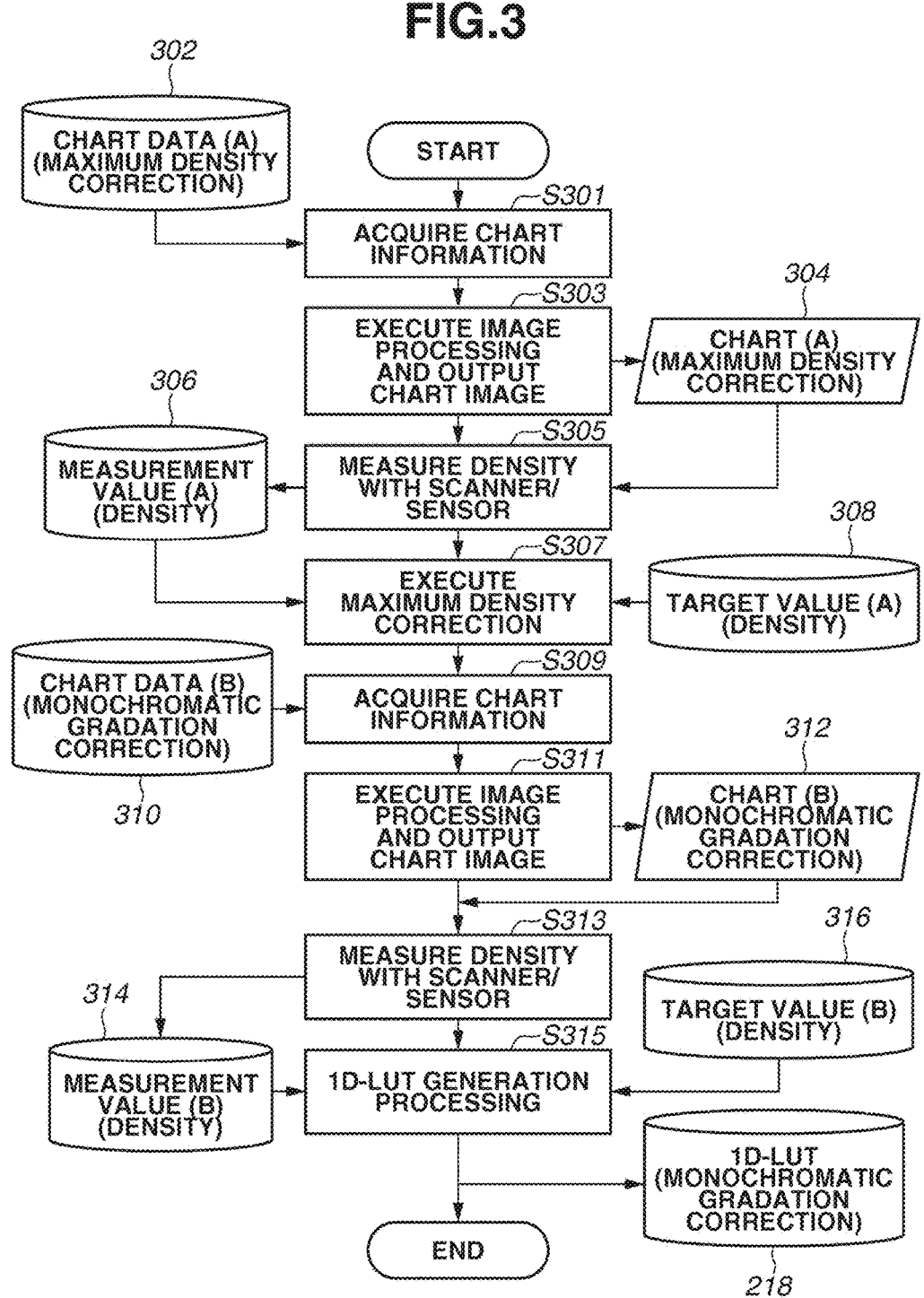
FIG. 3 is a flowchart illustrating operations in monochromatic calibration.

The following describes "monochromatic calibration" for correcting the monochromatic gradation characteristics output from the printer 115, with reference to FIG. 3. Performing monochromatic calibration enables correcting the monochromatic color reproduction characteristics, such as the maximum density characteristics and the gradation characteristics. The color reproduction characteristics corresponding to each of the C, M, Y, and K toners used in the printer 115 are corrected together at the time of execution of calibration. Specifically, the processing illustrated in FIG. 3 is executed at the same time for each of the C, M, Y, and K colors.

FIG. 3 is a flowchart illustrating processing for generating the 1D-LUT 218 for correcting the monochromatic gradation characteristics. The processing of the flowchart illustrated in FIG. 3 is implemented when the CPU 103 executes each step. The generated 1D-LUT 218 is stored in the storage device 121. The CPU 103 displays an instruction for the user on a UI via the display unit 118, and receives a user instruction from the input unit 120.

In step S301, the CPU 103 acquires chart data (A) 302 stored in the storage device 121. The chart data (A) 302, used for correcting the maximum density for each of the C, M, Y, and K monochromatic colors, includes such a signal value (for example, 255) that gives maximum density data for each of the C, M, Y, and K monochromatic colors.

Figure 5A:
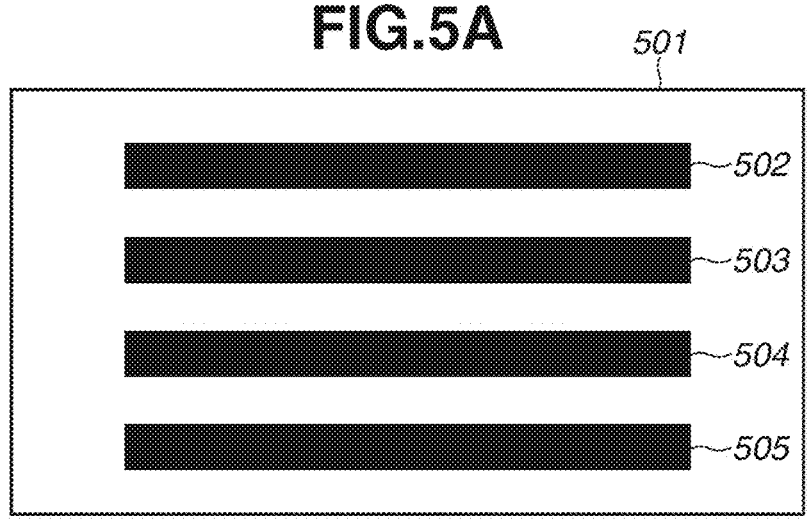
FIGS. 5A, 5B, and 5C illustrate examples of chart data.
Figure 5B:
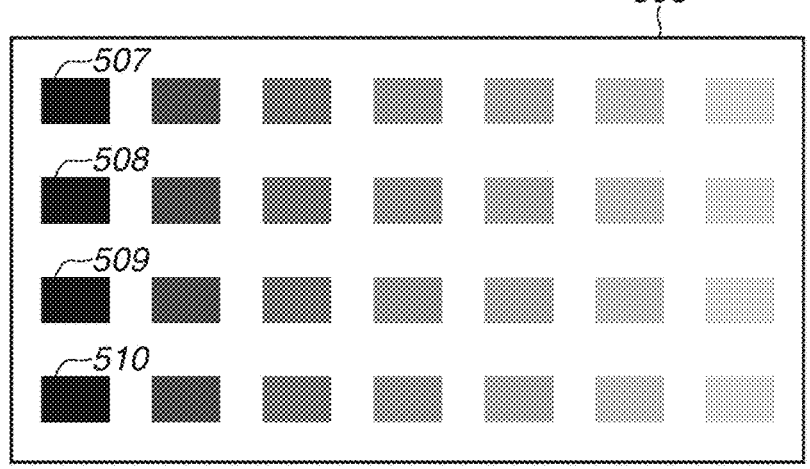
Figure 5C:
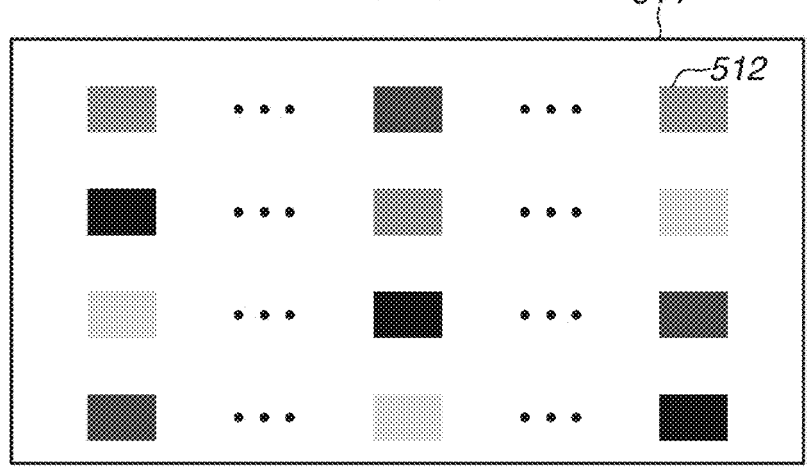

In step S303, the CPU 103 executes image processing on the chart data (A) 302 via the image processing unit 114, and prints a chart image (A) 304 (pattern image) at the printer 115. Examples are illustrated in FIGS. 5A, 5B, and 5C. FIG. 5A illustrates an example of a pattern image 501 produced by printing the chart data (A) 302. Patch images 502, 503, 504, and 505 are printed with the maximum density of the C, M, Y, and K monochromatic colors, respectively. Thus, the chart image (A) 304 (pattern image) includes a plurality of patch images. In this case, the image processing unit 114 executes only halftone processing in step S214, and executes neither the correction processing with the 1D-DUT in step S213 nor the correction processing with the 4D-DUT in step S212.

In step S305, the CPU 103 executes density measurement of a print product of the chart image (A) 304 by using the scanner 119 and the sensor 127 in the measurement unit 126 to obtain a measurement value (A) 306.

When executing calibration without user's intervention, the CPU 103 measures the chart image (A) 304 by using the sensor 127. The measurement value (A) 306 is a density value for each of the C, M, Y, and K colors. In step S307, the CPU 103 corrects the maximum density of the measurement value (A) 306 for each color by using the measurement value (A) 306 and a preset target value (A) 308 of the maximum density value. The CPU 103 adjusts device setting values of the printer 115, such as a laser output and a developing bias, so that the maximum density approaches the target value 308 (A).

In step S309, the CPU 103 acquires chart data (B) 310 stored in the storage device 121. The chart data (B) 310 includes signal values for gradation data of the C, M, Y, and K "monochromatic colors". FIG. 5B illustrates an example of a chart image (B) 312 (pattern image) having a plurality of patch images printed on a recording medium based on the chart data (B) 310. FIG. 5B illustrates an example of a print product of the chart image (B) 312 having the plurality of patch images printed on a recording medium based on the chart data (B) 310. Referring to FIG. 5B, patch images 507, 508, 509, and 510, and the subsequent patch images to the right thereof include gradation data of the C, M, Y, and K colors, respectively. Thus, the chart image (B) 312 (pattern image) includes a plurality of patch images.

In step S311, the CPU 103 executes image processing on the chart data (B) 310 via the image processing unit 114, and prints the chart image (B) 312 at the printer 115. In this case, the image processing unit 114 executes only halftone processing in step S214, and executes neither the correction processing with the 1D-DUT in step S213 nor the correction processing with the 4D-DUT in step S212. Since the printer 115 corrects the maximum density in step S307 as described above, the maximum density is equivalent to the target value (A) 308.

In step S313, the CPU 103 executes measurement by using the scanner 119 and the sensor 127 to obtain a measurement value (B) 314.

To execute calibration without user's intervention, the CPU 103 measures the chart image (B) 314 by using the sensor 127.

The measurement value (B) 314 is a density value acquired from the gradation for each of the C, M, Y, and K colors. In step S315, the CPU 103 generates a 1D-LUT 218 for correcting the monochromatic gradation by using the measurement value (B) 314 and a preset target value (B) 316.

Figure 4:
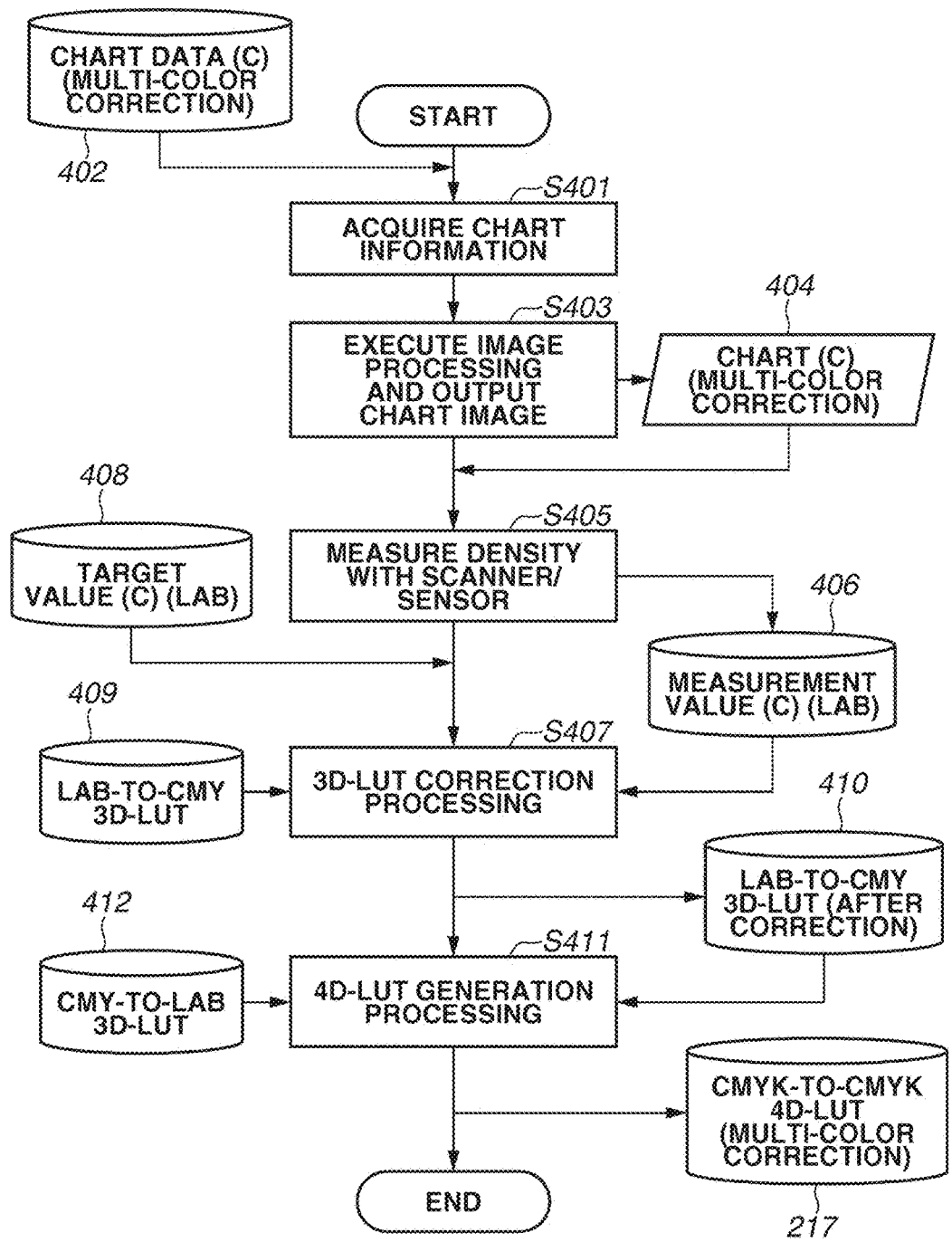
FIG. 4 is a flowchart illustrating operations in multi-color calibration.

The following describes "multi-color calibration" for correcting the multi-color characteristics output from the printer 115, with reference to FIG. 4. Performing multi-color calibration enables correcting the multi-color reproduction characteristics expressed by a combination (for example, superposition) of a plurality of color toners. The processing of the flowchart illustrated in FIG. 4 is implemented when the CPU 103 in the controller 102 executes each step. This acquired 4D-LUT 217 is stored in the storage device 121. The CPU 103 displays an instruction for the user on a UI via the display unit 118, and receives a user instruction from the input unit 120.

In multi-color calibration, the CPU 103 corrects multi-color output from the printer 115 after execution of monochromatic calibration. Therefore, it is desirable to execute multi-color calibration immediately after execution of monochromatic calibration.

In step S401, the CPU 103 acquires information of "multi-color" chart data (C) 402 stored in the storage device 121. The chart data (C) 402, used for multi-color correction, includes "multi-color" signal values which are a combination of the C, M, Y, and K colors. FIG. 5C illustrates an example of a chart image (C) 404 (pattern image) having a plurality of patch images printed on a recording medium based on the chart data (C) 402. FIG. 5C illustrates a pattern image 511 produced by printing the chart data (C) 402. A patch image 512 and all other patch images printed on the pattern image 511 are formed of a multi-color, i.e., a combination of the C, M, Y, and K toners. Thus, the chart image (C) 404 (pattern image) includes a plurality of patch images.

In step S403, the CPU 103 executes image processing on the chart data (C) 402 via the image processing unit 114, and prints the chart image (C) 404 at the printer 115. In multi-color calibration, to correct the device multi-color characteristics after execution of monochromatic calibration, the 1D-LUT 218 generated at the time of execution of monochromatic calibration is used for image processing by the image processing unit 114.

In step S405, the CPU 103 executes multi-color measurement of the print product of the chart image (C) 404 by using the scanner 119 and the sensor 127 in the measurement unit 126 to acquire a measurement value (C) 406.

To execute calibration without user's intervention, the CPU 103 measures the chart image (C) 406 by using the sensor 127.

The measurement value (C) 406 indicates the multi-color characteristics of the printer 115 after execution of monochromatic calibration. Further, the measurement value (C) 406 is a value in a device-independent color space, and is referred to as Lab in the present exemplary embodiment. When the scanner 119 is used, the CPU 103 converts an RGB value into an Lab value based on a 3D-LUT (not illustrated).

In step S407, the CPU 103 acquires an Lab-to-CMY 3D-LUT 409 stored in the storage device 121, reflects the difference between the measurement value 406 (C) and a preset target value (C) 408 to the Lab-to-CMY 3D-LUT 409, and generates an Lab-to-CMY 3D-LUT (after correction) 410. An Lab-to-CMY 3D-LUT is a 3D LUT for outputting a CMY value corresponding to an input Lab value.

A method for generating an Lab-to-CMY 3D-LUT will be described below. The CPU 103 adds a difference between the measurement value 406 (C) and the preset target value (C) 408 to the Lab value on the input side of the Lab-to-CMY 3D-LUT 409, and executes interpolating calculation based on the Lab-to-CMY 3D-LUT 409 on the Lab value to which the difference is reflected. As a result, the CPU 103 generates an Lab-to-CMY 3D-LUT (after correction) 410.

In step S411, the CPU 103 acquires a CMY-to-Lab 3D-LUT 412 stored in the storage device 121, and executes calculation based on the Lab-to-CMY 3D-LUT (after correction) 410. Thus, the CPU 103 generates the CMYK-to-CMYK 4D-LUT 217. A CMY-to-Lab 3D-LUT of is a 3D LUT for outputting an Lab value corresponding to an input CMY value.

A method for generating the CMYK-to-CMYK 4D-LUT 217 is illustrated below. The CPU 103 generates a CMY-to-CMY 3D-LUT based on the CMY-to-Lab 3D-LUT 412 and the Lab-to-CMY 3D-LUT (after correction) 410. Then, the CPU 103 generates the CMYK-to-CMYK 4D-LUT 217 so that the input value and the output value of K coincide with each other. A CMY-to-CMY 3D-LUT is a 3D LUT for outputting a CMY value after correction corresponding to an input CMY value.

Figure 13:
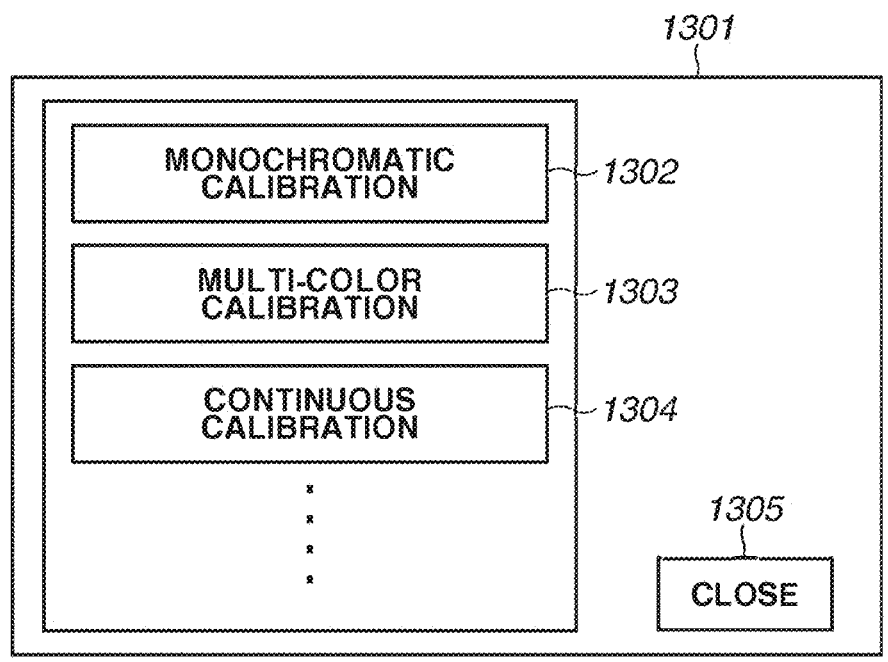
FIG. 13 illustrates a portal screen for various operations.

FIG. 13 illustrates an example of a portal screen displayed when monochromatic calibration and multi-color calibration are selectively executed.

This portal screen collects buttons for various calibrations and other functions frequently used, and includes at least a CONTINUOUS CALIBRATION button 1304 for continuously executing monochromatic calibration and multi-color calibration. The screen may further include a MONOCHROMATIC CALIBRATION button 1302 for performing monochromatic calibration, a MULTI-COLOR CALIBRATION button 1303 for performing multi-color calibration, and other buttons.

When the MONOCHROMATIC CALIBRATION button 1302 is pressed, the screen changes to a MONOCHROMATIC CALIBRATION execution instruction screen 701.

When the MULTI-COLOR CALIBRATION button 1303 is pressed, the screen changes to a MULTI-COLOR CALIBRATION execution instruction screen 1001.

Figure 16:
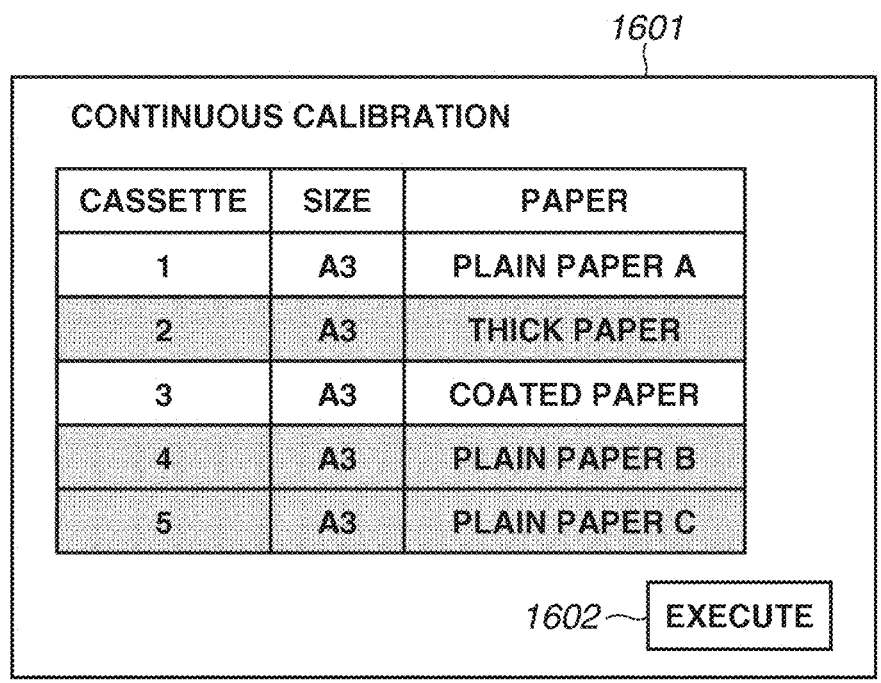
FIG. 16 illustrates an example of a sheet feed stage selection screen according to the first exemplary embodiment.

When the CONTINUOUS CALIBRATION button 1304 is selected, a screen for sheet feed stage selection illustrated in FIG. 16 is displayed, and continuous calibration is executed by using paper belonging to the selected paper type. FIG. 16 will be described below.

Specifically, after completion of monochromatic calibration, the CPU 103 prints the chart image (C) 404 for multi-color calibration, and starts multi-color calibration. Alternatively, the CPU 103 may display a button for starting multi-color calibration on a UI screen, and start multi-color calibration when the button is pressed by the user.

On the other hand, when the MONOCHROMATIC CALIBRATION button 1302 is selected, the CPU 103 executes only monochromatic calibration. Similarly, when the MULTI-COLOR CALIBRATION button 1303 is pressed, the CPU 103 executes only multi-color calibration.

The following describes the reason why different buttons are used for monochromatic calibration and multi-color calibration. When printing the chart image (C) 404 used at the time of execution of multi-color calibration, the CPU 103 uses the 1D-LUT 218 generated in monochromatic calibration. Therefore, it is desirable to correct the multi-color reproduction characteristics by performing multi-color calibration immediately after monochromatic calibration, i.e., immediately after the monochromatic color reproduction characteristics have been corrected. However, if two different calibrations are performed, the user will consume much processing time for calibrations.

Therefore, to reduce processing time, the CPU 103 executes either multi-color calibration or monochromatic calibration depending on the user's operating environment. Thus, there arises a difference between frequencies of execution of the two calibrations. For example, a user who frequently performs monochromatic printing performs multi-color calibration not so frequently. Further, a user who frequently performs multi-color printing, such as photograph printing, frequently performs multi-color calibration.

The CPU 103 may control the timing at which a color correction menu can be selected.

In many cases, the power of an image processing apparatus is turned off during the night and turned on in the morning. Therefore, when a main power switch of the MFP 101 is turned ON and the power is supplied, the CPU 103 may enable only the CONTINUOUS CALIBRATION button 1304. Alternatively, when neither of the two calibrations is performed within a predetermined time duration, the CPU 103 may enable only the CONTINUOUS CALIBRATION button 1304. Alternatively, when neither of the two calibrations is performed until printing is made for a predetermined number of sheets, the CPU 103 may enable only the CONTINUOUS CALIBRATION button 1304.

Alternatively, when a predetermined time duration has elapsed, when printing is made on a predetermined number of sheets, or when the power is turned ON, monochromatic calibration and multi-color calibration may be automatically performed in succession in this order.

When the user performs calibration at a predetermined timing, the CPU 103 allows the user to select only the CONTINUOUS CALIBRATION button 1304 as described above, thus prompting the user to execute multi-color calibration immediately after execution of monochromatic calibration at predetermined intervals.

Therefore, the user is allowed to select either execution of both calibrations (monochromatic calibration and multi-color calibration in this order as described above) or execution of either monochromatic calibration or multi-color calibration. Thus, the user is allowed to suitably perform calibration according to user's operating conditions.

Performing control to allow the user to select only execution of both calibrations at predetermined intervals enables preventing reduction in reproduction characteristics correction accuracy due to execution of either one calibration. The present exemplary embodiment is executed when the CONTINUOUS CALIBRATION button 1304 in an operations portal screen 1301 illustrated in FIG. 13 is pressed to instruct execution of "continuous calibration" in which monochromatic calibration and multi-color calibration are automatically executed in succession in this order.

The storage device 121 of the MFP 101 is able to store information including a pair of the target value (A) and the target value (B) corresponding to each of a plurality of paper types, and time stamp information indicating the date and time of registration of the pair of the target value (A) and the target value (B). The storage device 121 of the MFP 101 can further store information including the target value (C) corresponding to each of a plurality of paper types, and time stamp information indicating the date and time of registration of the target value (C) corresponding to the relevant paper type.

Further, for the 1D-LUT 218 and the 4D-LUT 217, the storage device 121 is able to store time stamp information indicating the date and time of LUT generation and paper information indicating paper used for LUT generation. The paper information includes at least the paper type.

Figure 7:
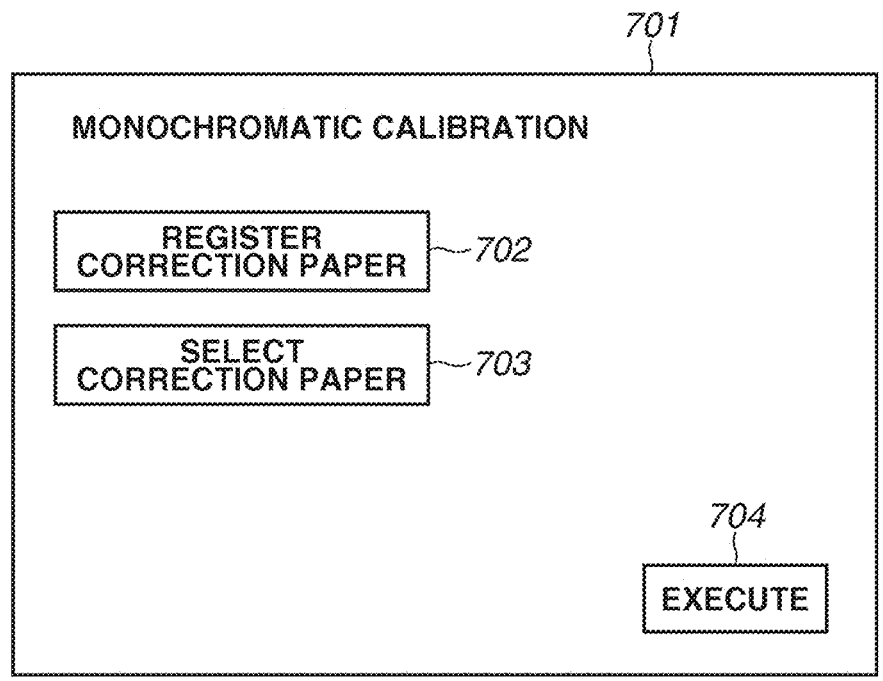
FIG. 7 illustrates a monochromatic calibration execution instruction screen.

FIG. 7 illustrates an example of the MONOCHROMATIC CALIBRATION execution instruction screen 701.

The MONOCHROMATIC CALIBRATION execution instruction screen 701 includes at least a REGISTER CORRECTION PAPER button 702, a SELECT CORRECTION PAPER button 703, and an EXECUTE button 704.

Figure 8:
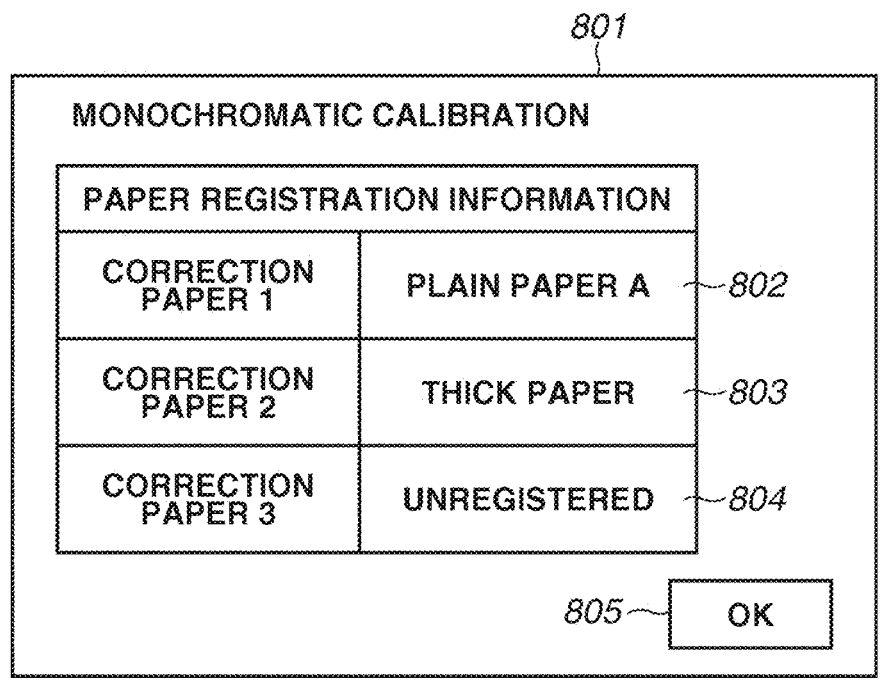
FIG. 8 illustrates a paper registration screen for monochromatic calibration.

When the REGISTER CORRECTION PAPER button 702 is pressed, the screen changes to the screen illustrated in FIG. 8. When the SELECT CORRECTION PAPER button 703 is pressed, the screen changes to the screen illustrated in FIG. 9.

Upon reception of an execution start instruction by the press of the EXECUTE button 704, the CPU 103 executes monochromatic calibration illustrated in FIG. 3 based on the target value (A) of the maximum value and the target value (B) of the gradation characteristics corresponding to the paper selected when the relevant button is pressed.

FIG. 8 illustrates a MONOCHROMATIC CALIBRATION paper registration screen 801 displayed when the REGISTER CORRECTION PAPER button 702 is pressed. Although FIG. 8 illustrates a case of three different registerable paper types (correction paper 1 802, correction paper 2 803, and correction paper 3 804), registerable paper types are not limited thereto. One, two, or more number of paper types can be registered. The MONOCHROMATIC CALIBRATION screen 801 enables storing the paper type (the correction paper 1, the correction paper 2, and the correction paper 3), the target value (A), and the target value (B) in combination. More specifically, when plain paper A is registered as the correction paper 1, the target value (A) and the target value (B) corresponding to plain paper A are stored in association with information indicating the relevant paper type (plain paper A). Likewise, when thick paper is registered as the correction paper 2, the target value (A) and the target value (B) corresponding to thick paper are stored in association with information indicating the relevant paper type (thick paper).

Processing for associating a paper type with target values (or parameters for generating the target values) corresponding to the relevant paper type and then storing the relevant information in this way is referred to as registration processing.

When the registration completion button 805 is pressed, the screen changes to the MONOCHROMATIC CALIBRATION execution instruction screen 701 illustrated in FIG. 7.

Figure 9:
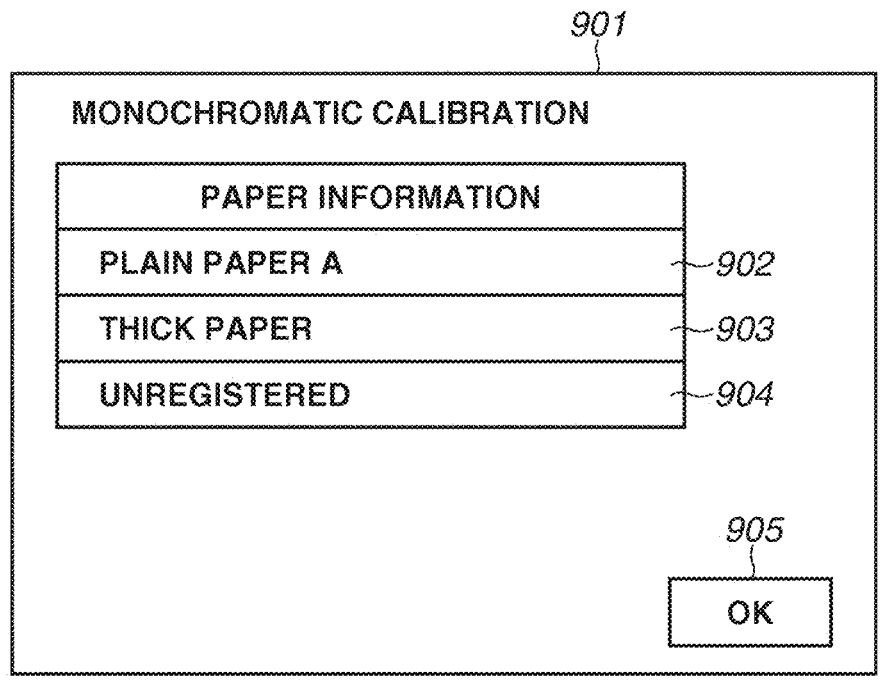
FIG. 9 illustrates a paper selection screen for monochromatic calibration.

FIG. 9 illustrates a MONOCHROMATIC CALIBRATION paper selection screen 901 displayed when the SELECT CORRECTION PAPER button 703 is pressed. Referring to FIG. 9, the paper information (paper type) of the correction paper registered in the MONOCHROMATIC CALIBRATION paper registration screen 801 is displayed in display fields 902, 903, and 904. The user is allowed to select a paper type to be used for subsequent monochromatic calibration. When the selection complete button 905 is pressed, the screen changes to the MONOCHROMATIC CALIBRATION execution instruction screen 701 illustrated in FIG. 7.

Figure 10:
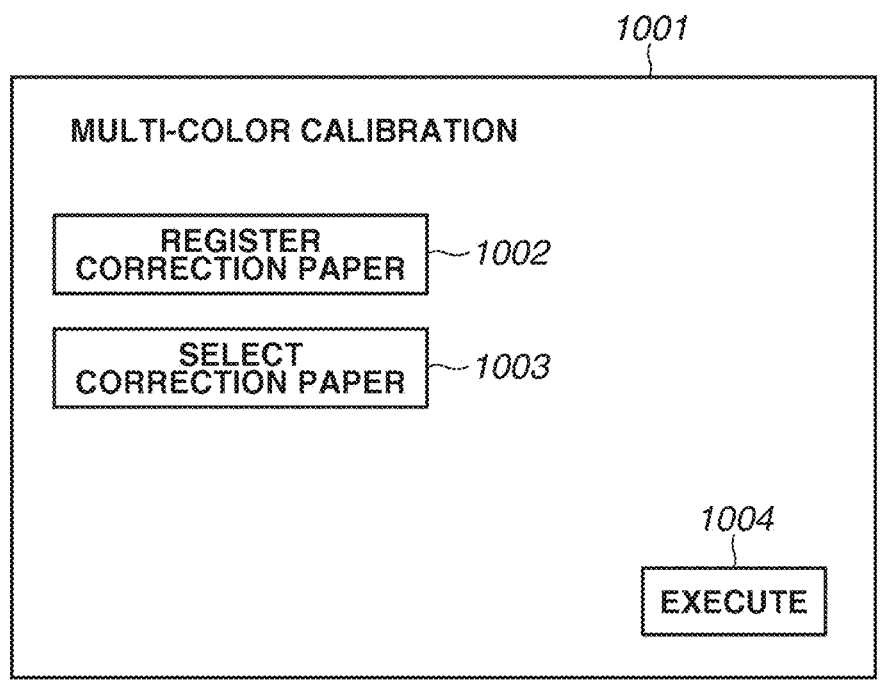
FIG. 10 illustrates a multi-color calibration execution instruction screen.

FIG. 10 illustrates an example of the MULTI-COLOR CALIBRATION execution instruction screen 1001.

The MULTI-COLOR CALIBRATION execution instruction screen 1001 includes at least a REGISTER CORRECTION PAPER button 1002, a SELECT CORRECTION PAPER button 1003, and an EXECUTE button 1004.

Upon reception of an execution start instruction by the depression of the EXECUTE button 1004, the CPU 103 executes multi-color calibration illustrated in FIG. 4 based on the target value (C) corresponding to the paper selected when the relevant button is pressed.

Figure 11:
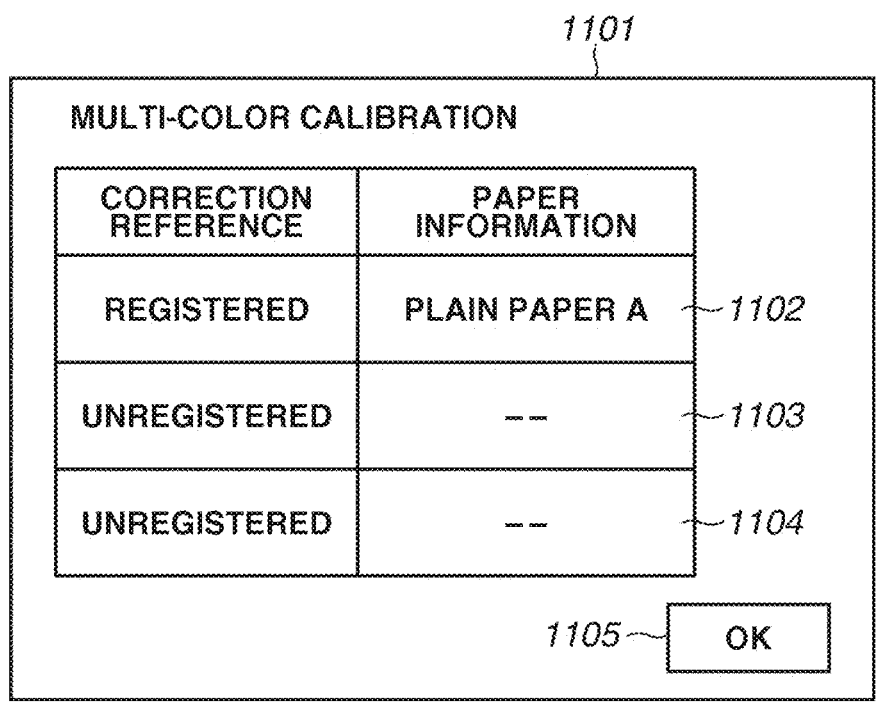
FIG. 11 illustrates a paper registration screen for multi-color calibration.

When the REGISTER CORRECTION PAPER button 1002 is pressed, the screen changes to the screen illustrated in FIG. 11. When the SELECT CORRECTION PAPER button 1003 is pressed, the screen changes to the screen illustrated in FIG. 12.

FIG. 11 illustrates a MULTI-COLOR CALIBRATION paper registration screen 1101 displayed when the REGISTER CORRECTION PAPER button 1002 is pressed. Although FIG. 11 illustrates three different registerable paper types (correction paper 1 1102, correction paper 2 1103, and correction paper 3 1104), registerable paper types are not limited thereto. One, two, or more number of paper types can be registered. The MULTI-COLOR CALIBRATION screen 1101 enables storing the paper type (correction paper 1, the correction paper 2, and the correction paper 3) and the target value (C) in combination. More specifically, when plain paper A is registered as the correction paper 1, the target value (C) corresponding to plain paper A is stored in association with information indicating the relevant paper type (plain paper A).

When the registration completion button 805 is pressed, the screen changes to the MULTI-COLOR CALIBRATION execution instruction screen 1001 illustrated in FIG. 10.

Figure 12:
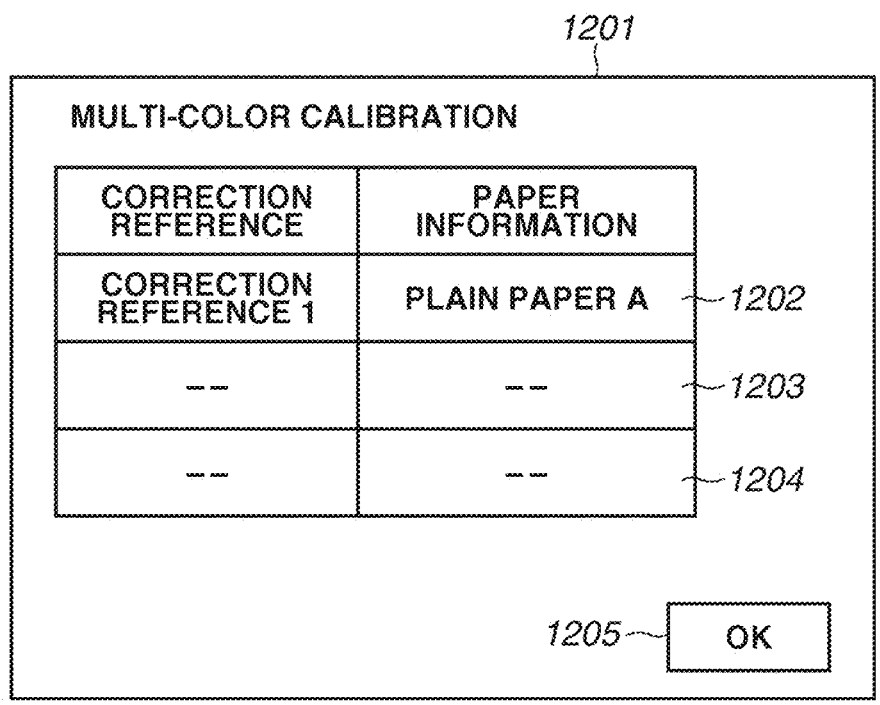
FIG. 12 illustrates a paper selection screen for multi-color calibration.

FIG. 12 illustrates a MULTI-COLOR CALIBRATION paper selection screen 1201 displayed when the SELECT CORRECTION PAPER button 1003 is pressed. Referring to FIG. 12, the paper information (paper type) of the correction paper registered in the MULTI-COLOR CALIBRATION paper registration screen 1101 is displayed in displayed fields 1202, 1203, and 1204. The user is allowed to select a paper type to be used for subsequent multi-color calibration. When the selection complete button 1205 is pressed, the screen changes to the MULTI-COLOR CALIBRATION execution instruction screen 1001 illustrated in FIG. 10.

In a first exemplary embodiment, the MFP 101 is used as an image forming apparatus, and paper to be used for continuous calibration is selected when the user instructs execution of continuous calibration. The following describes operations for selecting paper.

Figure 6:
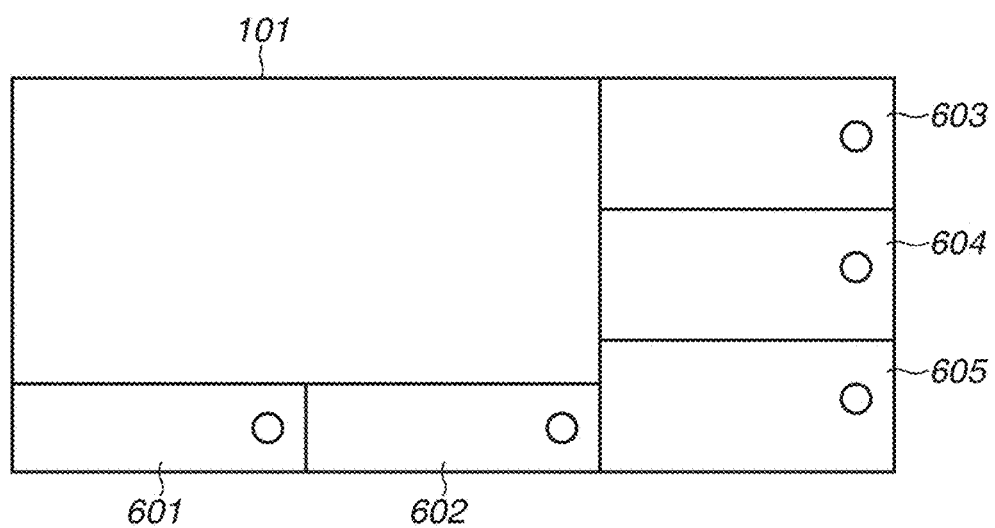
FIG. 6 illustrates an example of sheet feed stages of the MFP.

FIG. 6 illustrates an example of the sheet feeding unit 116 of the MFP 101. In the first exemplary embodiment, the MFP 101 is provided with a first sheet feed stage 601, a second sheet feed stage 602, a third sheet feed stage 603, a fourth sheet feed stage 604, and a fifth sheet feed stage 605 for storing paper. These sheet feed stages are able to store different types of paper.

The CPU 103 inputs paper information indicating paper stored in each sheet feed stage from the input unit 120, associates the first to the fifth sheet feed stages 601 to 605 with the paper information, and stores sheet feed stage information in the storage device 121. Although, in the present exemplary embodiment, the first to the fifth sheet feed stages as an example may be trays and manual feed slots, the form of these sheet feed stages is not limited thereto. The MFP 101 may be provided with at least one sheet feed stage.

Figure 14:
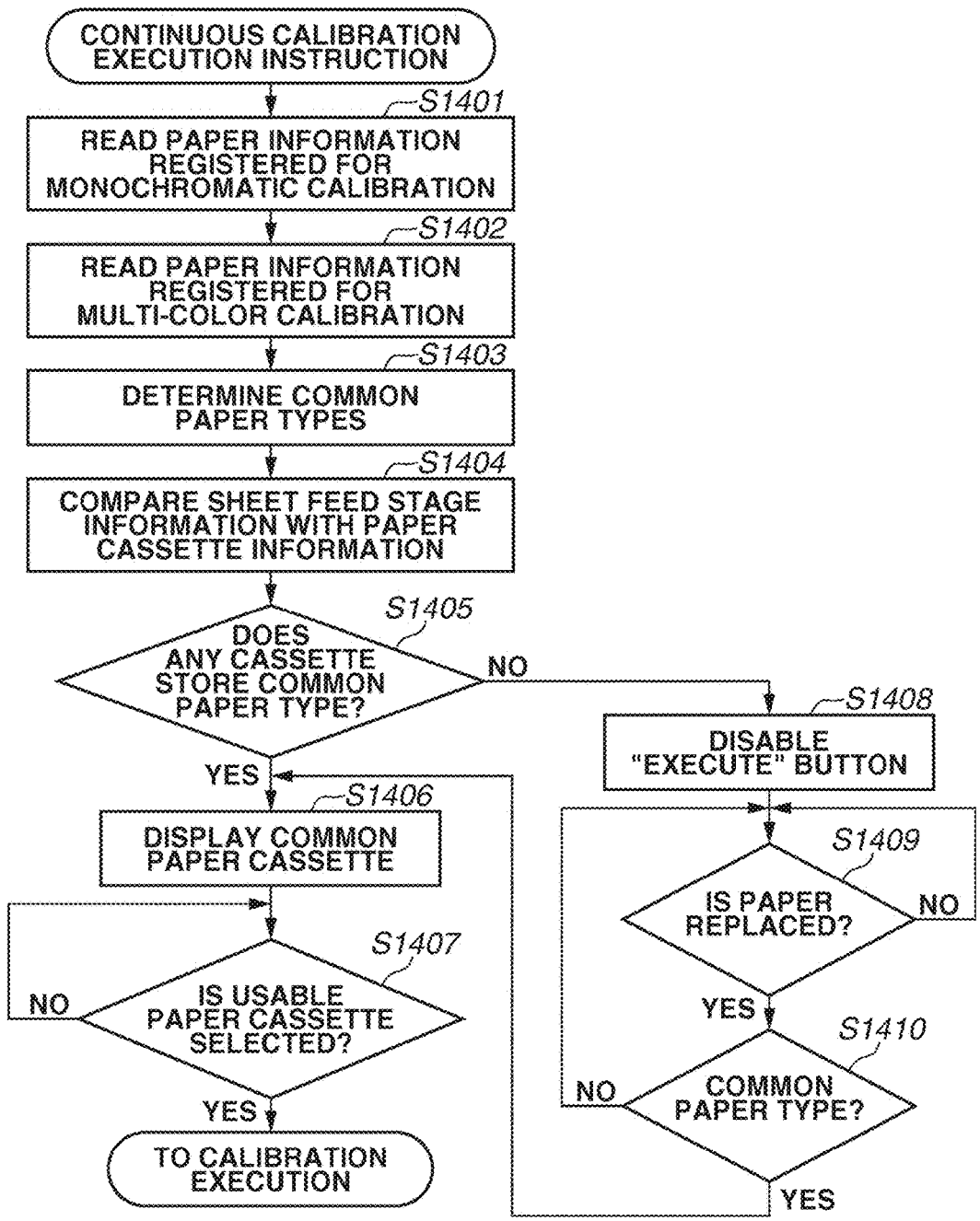
FIG. 14 is a flowchart illustrating operations of a first exemplary embodiment.

FIG. 14 is a flowchart illustrating operations according to the present exemplary embodiment.

Each step of the flowchart is implemented when the CPU 103 loads a control program (not illustrated) stored in the storage device 121 into a RAM (not illustrated) and then executes it.

The processing illustrated in FIG. 14 is activated after completion of paper registration in each of the flowcharts illustrated in FIGS. 8 and 11.

When the CONTINUOUS CALIBRATION button 1304 is pressed in the operations portal screen 1301, then in step S1401, the CPU 103 reads from the storage device 121 paper information indicating paper types registered to be used at the time of execution of monochromatic calibration.

In step S1402, the CPU 103 reads from the storage device 121 paper information indicating paper types registered to be used at the time of execution of multi-color calibration.

The CPU 103 compares the registered paper for monochromatic calibration read in step S1401 with the registered paper for multi-color calibration read in step S1402. In step S1403, out of the paper types registered as paper to be used for respective calibrations, the CPU 103 extracts and determines paper types registered in common for respectively calibrations. FIG. 15 illustrates an example of paper types registered to be used at the time of execution of monochromatic calibration and paper types registered to be used at the time of execution of multi-color calibration. Plain paper A, thick paper, and coated paper are assumed to have been registered for monochromatic calibration. Plain paper A, plain paper B, and coated paper are assumed to have been registered for multi-color calibration. In this case, plain paper A and coated paper are extracted and determined as common paper types. Hereinafter, these extracted paper types are referred to as "common paper types".

In step S1404, the CPU 103 reads sheet feed stage information from the storage device 121, and compares the relevant information with the common paper types determined in step S1403.

In step S1405, as a result of the comparison in step S1404, the CPU 103 determine whether any sheet stage stores paper belonging to the common paper types.

When a sheet feed stage is determined to store paper belonging to the common paper types determined in step S1405 (YES in step S1405), then in step S1406, the CPU 103 displays on the display unit 118 the sheet feed stage storing paper belonging to the common paper types, as illustrated in FIG. 16.

FIG. 16 illustrates an example of a sheet feed stage selection (CONTINUOUS CALIBRATION) screen 1601 displayed when the CONTINUOUS CALIBRATION button 1304 is pressed. The CONTINUOUS CALIBRATION screen 1601 displays paper information indicating paper stored in the first to the fifth sheet feed stages, as well as sheet feed stages storing paper belonging to the common paper types determined in step S1405. Sheet feed stages storing paper types registered as paper to be used only for one calibration are grayed out. This means that paper stored in the sheet feed stages grayed out cannot be used at the time of execution of continuous calibration. Specifically, in the present exemplary embodiment, only plain paper A in the sheet feed stage 1 and coated paper in the sheet feed stage 3 can use used at the time of execution of continuous calibration. Although, in the present exemplary embodiment, sheet feed stages storing paper unusable for continuous calibration are grayed out, the processing is not limited thereto.

For example, the screen may display only sheet feed stages storing paper usable at the time of execution of continuous calibration, as illustrated in FIG. 17, as long as the relevant usable sheet feed stages are distinguished from other (unusable) sheet feed stages. In step S1407, the CPU 103 determines whether paper usable at the time of execution of continuous calibration, i.e., whether the sheet feed stage 1 or the sheet feed stage 3, has been selected and then the continuous calibration execution (EXECUTE) button 1602 has been pressed. The CPU 103 waits until the continuous calibration execution (EXECUTE) button 1602 is pressed. When the continuous calibration execution (EXECUTE) button 1602 is determined to have been pressed (YES in step S1407), the processing exits this flowchart and proceeds to execution of continuous calibration.

When none of the sheet feed stages is determined to store paper belonging to the common paper types (NO in step S1405), then in step S1408, the CPU disables the continuous calibration execution (EXECUTE) button 1602 illustrated in FIG. 16. In step S1409, the CPU 103 monitors whether paper has been replaced in any one of the five sheet feed stages.

In step S1409, the sheet feed stage selection (CONTINUOUS CALIBRATION) screen 1601 or 1701 illustrated in FIG. 16 or 17, respectively, may prompt the user to store paper belonging to any one of the paper types determined in step S1403 in one of the sheet feed stages. When paper is determined to have been replaced in any one of the five sheet feed stages (YES in step S1409), then in step S1410, the CPU 103 determines whether the replaced paper is paper belonging to the common paper types. The CPU 103 detects replacement of paper by using a sheet feed stage open/close sensor (not illustrated) for detecting opening and closing of each sheet feed stage. The CPU 103 monitors a signal from the sheet feed stage open/close sensor. When the sheet feed stage open/close sensor outputs a sheet feed stage open signal and, immediately after this signal, outputs a sheet feed stage close signal, the CPU 103 determines that paper has been replaced in the relevant sheet feed stage. Subsequently, the user inputs paper information indicating paper stored in each sheet feed stage from the input unit 120, and compares the paper information with the previously input paper information. If there is a difference between the two pieces of paper information, the CPU 103 determines that paper has been replaced in the relevant sheet feed stage. Based on the paper information, the CPU 103 is able to determine whether the replaced paper is paper belonging to the common paper types.

When the paper is determined to be paper belonging to the common paper types (YES in step S1410), the processing proceeds to step S1406. When the paper is determined not to be paper belonging to the common paper types (NO in step S1410), the processing returns to step S1409, and the CPU 103 waits for replacement of paper.

A CANCEL button (not illustrated) is constantly displayed on the display unit 118. When the CANCEL button is pressed, the CPU 103 forcibly stops all the above-described operations, and displays a screen equivalent to the initial screen of the apparatus.

As described above, according to the present exemplary embodiment, in the case of continuous execution of a plurality of calibrations for different correction targets, the user is allowed to select a paper type of paper to be used for calibrations or select a sheet feed stage storing paper belonging to the selected paper type through one piece of processing. This facilitates operations for selecting a sheet feed stage at the time of execution of continuous calibration.

Further, in the case of continuous execution of a plurality of calibrations for different correction targets, the apparatus is able to receive a calibration execution instruction from the user with reduced processing. This enables reducing user's workloads to reduce user's intervention when instructing calibration execution.

In the case of continuous execution of a plurality of calibrations for different correction targets, such as monochromatic calibration and multi-color calibration, it becomes easier to conform a paper type of paper to be used at the time of execution of monochromatic calibration to a paper type of paper to be used at the time of execution of multi-color calibration. This eliminates the need of registering a plurality of target values for multi-color calibration.

The following describes a second exemplary embodiment based on another form of operations for selecting paper to be used at the time of execution of continuous calibration when the CONTINUOUS CALIBRATION button 1304 is pressed in the operations portal screen 1301.

Figure 18:
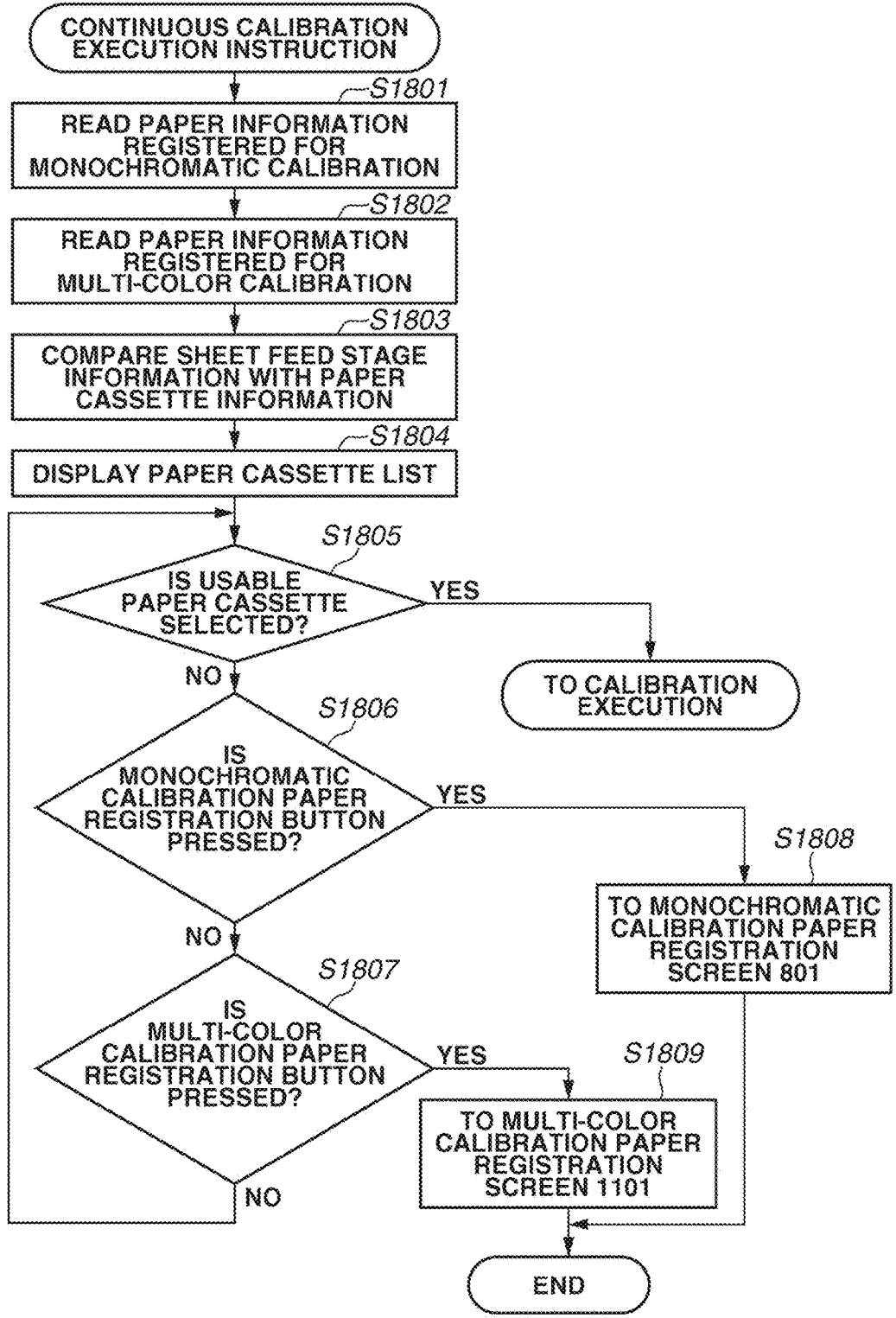
FIG. 18 is a flowchart illustrating operations according to a second exemplary embodiment.

FIG. 18 is a flowchart illustrating operations according to the present exemplary embodiment.

Each step of the flowchart is implemented when the CPU 103 loads a control program (not illustrated) stored in the storage device 121 into a RAM (not illustrated) and then executes it.

When the CONTINUOUS CALIBRATION button 1304 is pressed in the operations portal screen 1301, then in step S1801, the CPU 103 reads from the storage device 121 paper information indicating paper types registered to be used at the time of execution of monochromatic calibration.

In step S1802, the CPU 103 reads from the storage device 121 paper information indicating paper types registered to be used at the time of execution of multi-color calibration.

In step S1803, the CPU 103 reads sheet feed stage information from the storage device 121, and then, as illustrated in step S1403, determines paper types registered to be used in common for both calibrations out of paper types registered as paper to be used at the time of execution of each calibration.

Figure 19:
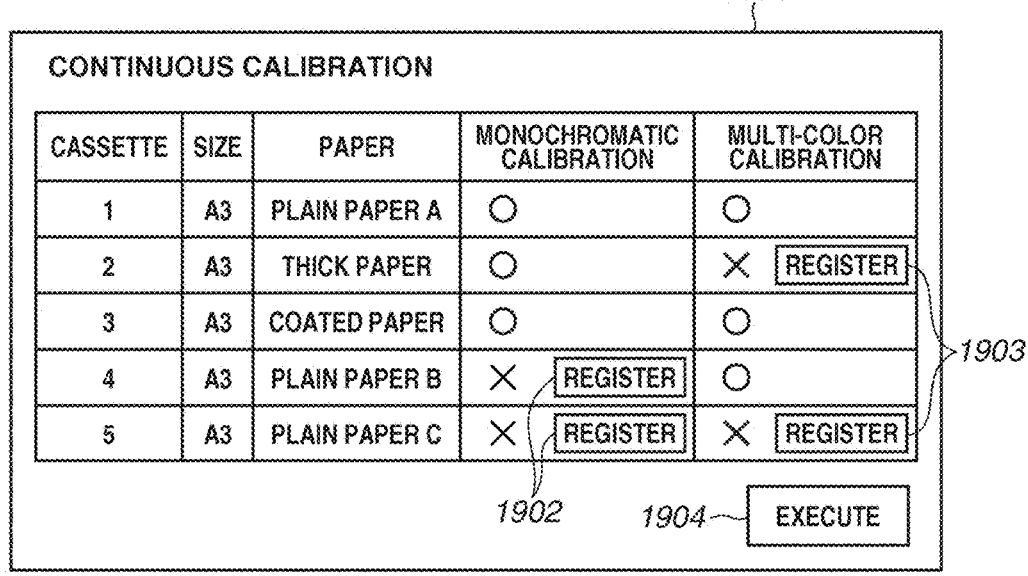
FIG. 19 illustrates an example of a sheet feed stage selection screen according to the second exemplary embodiment.

In step S1804, the CPU 103 displays a sheet feed stage selection (CONTINUOUS CALIBRATION) screen 1901 indicating the status of each sheet feed stage of the MFP 101, as illustrated in FIG. 19.

FIG. 19 illustrates an example of the sheet feed stage selection (CONTINUOUS CALIBRATION) screen 1901 displayed when the CONTINUOUS CALIBRATION button 1304 is pressed. The CONTINUOUS CALIBRATION screen 1901 displays paper information indicating paper stored in the first to the fifth sheet feed stages, as well as information about paper stored in each sheet feed stage obtained in the determination processing in step S1803, i.e., whether paper is usable at the time of execution of monochromatic calibration and at the time of execution of multi-color calibration. Referring to FIG. 19, a circle (o) indicates that the relevant paper is usable for each calibration, and a cross (x) indicates that the relevant paper is not usable therefor.

For example, when the registered paper status is as illustrated in FIG. 15, the sheet feed stage selection (CONTINUOUS CALIBRATION) screen 1901 displays information as illustrated in FIG. 19.

In each of the x display fields, a monochromatic calibration paper registration (REGISTER) button 1902 or a multi-color calibration paper registration (REGISTER) button 1903 is displayed.

When the sheet feed stage 1 or the sheet feed stage 3 is selected and then the CONTINUOUS CALIBRATION button 1304 is pressed in the sheet feed stage selection (CONTINUOUS CALIBRATION) screen 1901 (YES in step S1805), the processing exits this flowchart and proceeds to execution of continuous calibration.

When neither the sheet feed stage 1 nor the sheet feed stage 3 is selected (NO in step S1805), then in step S1806, the CPU 103 determines whether the monochromatic calibration paper registration (REGISTER) button 1902 has been pressed. When the monochromatic calibration paper registration (REGISTER) button 1902 is determined to have been pressed (YES in step S1806), then in step S1808, the screen changes to the MONOCHROMATIC CALIBRATION paper registration screen 801, and terminates the continuous calibration operation.

When the screen changes to the MONOCHROMATIC CALIBRATION paper registration screen 801, the screen may return to the sheet feed stage selection (CONTINUOUS CALIBRATION) screen 1901 illustrated in FIG. 19 to register paper to be used at the time of execution of monochromatic calibration and then execute continuous calibration.

When the monochromatic calibration paper registration (REGISTER) button 1902 is determined not to be pressed (NO in step S1806), then in step S1807, the CPU 103 determines whether the multi-color calibration paper registration (REGISTER) button 1903 has been pressed. When the multi-color calibration paper registration (REGISTER) button 1903 is determined to have been pressed (YES in step S1807), then in step S1809, the screen changes to the MULTI-COLOR CALIBRATION paper registration screen 1101, and terminates the continuous calibration operation. When the screen changes to the MULTI-COLOR CALIBRATION paper registration screen 1101, the screen may return to the sheet feed stage selection (CONTINUOUS CALIBRATION) screen 1901 illustrated in FIG. 19 to register paper to be used at the time of execution of multi-color calibration and then execute continuous calibration.

When the multi-color calibration paper registration (REGISTER) button 1903 is determined not to be pressed (NO in step S1807), the processing returns to step S1805.

Configuring the present exemplary embodiment as described above enables achieving the effect of the first exemplary embodiment, and enables clearly indicating information about sheet feed stages unusable for continuous calibration and which calibration each of the relevant sheet feed stages is unusable for. Therefore, when paper belonging to a target paper type is unusable at the time of execution of continuous calibration, the CPU 103 is able to change to each calibration paper registration screen with reduced user operations, and register a desired paper type. Thus, it becomes possible to provide the user with a user-friendly operation screen.

Figure 20:
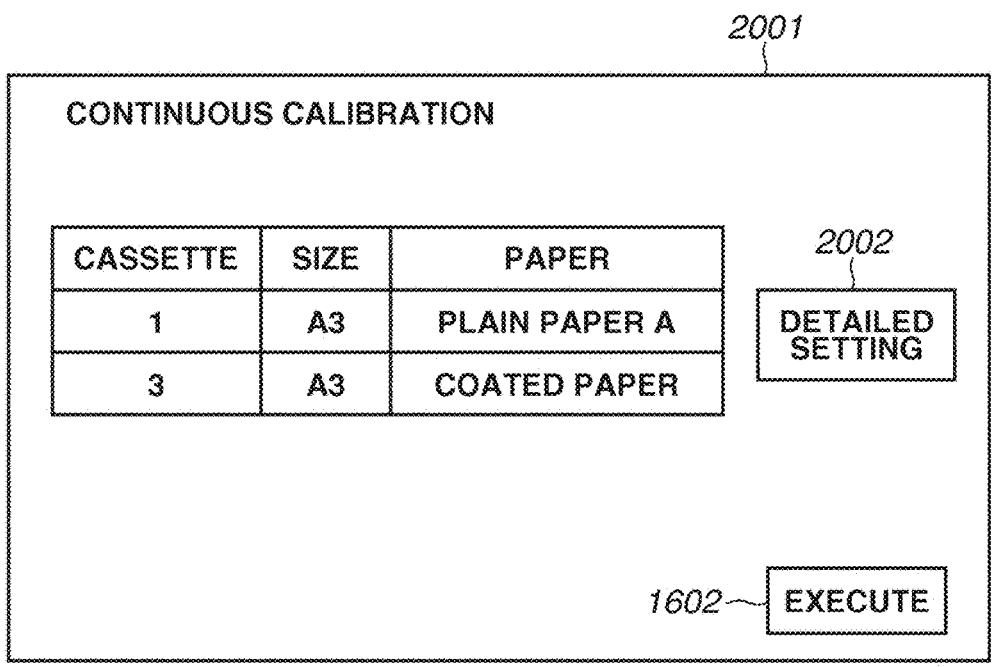
FIG. 20 illustrates an example of a sheet feed stage selection screen according to a third exemplary embodiment.

FIG. 20 illustrates a sheet feed stage selection (CONTINUOUS CALIBRATION) screen 2001 displayed in step S1406 according to a third exemplary embodiment. The CONTINUOUS CALIBRATION screen 2001 displays only sheet feed stages storing paper usable for continuous calibration, and a DETAILED SETTING button 2002.

When the DETAILED SETTING button 2002 is pressed, the screen changes to the sheet feed stage selection (CONTINUOUS CALIBRATION) screen 1901. When the screen changes to the sheet feed stage selection (CONTINUOUS CALIBRATION) screen 1901, the CPU 103 executes again operations in step S1804 and subsequent steps.

As described above, configuring the present exemplary embodiment as described above enables executing continuous calibration with easy operations, providing detailed information only when necessary, and display each calibration paper registration screen with reduced operations.

The present invention is also achieved by performing the following processing. Specifically, software (a program) for achieving the functions of the above-described exemplary embodiments is supplied to a system or an apparatus via a network or various storage media, and a computer (or a CPU or a microprocessor unit (MPU)) of the system or the apparatus reads the program and executes it.

Although the exemplary embodiments have specifically been described based on an electrophotographic apparatus, the exemplary embodiments are also applicable to an ink-jet printer and a thermal printer. The spirit or scope of the present invention is not limited to printer types. Although the exemplary embodiments have specifically been described based on toner in electrophotographic printing as a recording agent, the recording agent is not limited to toner, and may be ink or other recording agents. The spirit or scope of the present invention is not limited to recording agent types.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a display;
an image forming unit configured to form a color image using recording materials;
a selection unit configured to select a sheet cassette via the display;
a first processing unit configured to execute a first calibration, the first calibration being executed by measurements of a plurality of monochromatic images including at least monochromatic images of a first color and monochromatic images of a second color and generating, using measurement results, monochromatic calibration data, wherein each of the monochromatic images of the first color is formed using only a first color recording material by the image forming unit on a sheet stored in the sheet cassette selected by the selection unit, each of the monochromatic images of the second color is formed using only a second color recording material by the image forming unit on the sheet; and a second processing unit configured to execute a second calibration following execution of the first calibration, the second calibration being executed by measurements of a plurality of multi-color images and generating, using measurement results, multi-color calibration data, wherein each of the plurality of multi-color images is formed using a plurality of color recording materials by the image forming unit on a sheet stored in the sheet cassette selected by the selection unit and at least one multi-color image of the plurality of multi-color images is a chromatic color image which is formed using only the first color recording material and the second color recording material.

2. The image processing apparatus according to claim 1, wherein the plurality of monochromatic images formed using the first color recording material is different in density and the plurality of monochromatic images formed using the second color recording material is different in density.

3. The image processing apparatus according to claim 1, wherein the sheet has a paper type that indicates information about size and basis weight of a paper.

4. The image processing apparatus according to claim 1, wherein the first processing unit and the second processing unit control paper used at a time of execution of the second calibration and paper used at a time of execution of the first calibration to be fed from a same cassette.

5. The image processing apparatus according to claim 1, wherein the first processing unit and the second processing unit control to prohibit using paper of which type is different form a type of paper used at a time of execution of the first calibration for execution of the second calibration.

6. The image processing apparatus according to claim 1, wherein the multi-color image is formed by superposition of a plurality of color recording materials.

7. The image processing apparatus according to claim 1, wherein the first monochromatic color images are formed with different amounts of the first color recording material and the second monochromatic color images are formed with different amounts of the second color recording material.

8. An image processing method comprising:
selecting a sheet cassette via an operation unit;
first processing to execute a first calibration, the first calibration being executed by measurements of a plurality of monochromatic images including at least monochromatic images of a first color and monochromatic images of a second color and generating, using measurement results, monochromatic calibration data, wherein each of the monochromatic images of the first color is formed using only a first recording material on a sheet stored in the selected sheet cassette, each of the monochromatic images of the second color is formed using only a second color recording material on the sheet;
second processing to execute a second calibration following execution of the first calibration, the second calibration being executed by measurements of a plurality of multi-color images and generating, using measurement results, multi-color calibration data, wherein each of the plurality of multi-color images is formed using a plurality of color recording materials on a sheet stored in the selected sheet cassette and at least one multi-color image of the plurality of multi-color images is a chromatic color image which is formed using only the first color recording material and the second color recording material.

9. A non-transitory computer-readable storage medium storing a program that causes a computer to execute a method comprising:
selecting a sheet cassette via an operation unit;
first processing to execute monochromatic calibration, the monochromatic calibration being executed by measurements of a plurality of monochromatic images including at least monochromatic images of a first color and monochromatic images of a second color and generating, using measurement results, monochromatic calibration data, wherein each of the monochromatic images of the first color is formed using only a first color recording material on a sheet stored in the selected sheet cassette, each of the monochromatic images of the second color is formed using only a second color recording material on the sheet;
second processing to execute a second calibration following execution of the first calibration, the second calibration being executed by measurements of a plurality of multi-color images and generating, using measurement results, multi-color calibration data, wherein each of the plurality of multi-color images is formed using a plurality of color recording materials on a sheet stored in the selected sheet cassette and at least one multi-color image of the plurality of multi-color images is a chromatic color image which is formed using only the first color recording material and the second color recording material.

10. An image processing apparatus comprising:
a display;
an image forming unit configured to form a color image using recording materials;
a selection unit configured to select a sheet type via the display;
a first processing unit configured to execute a first calibration, the first calibration being executed by measurements of a plurality of monochromatic images including at least monochromatic images of a first color and monochromatic images of a second color and generating, using measurement results, monochromatic calibration data, wherein each of the monochromatic images of the first color is formed using only a first color recording material by the image forming unit on a sheet of the sheet type selected by the selection unit, each of the monochromatic images of the second color is formed using only a second color recording material by the image forming unit on the sheet; and
a second processing unit configured to execute a second calibration following execution of the first calibration, the second calibration being executed by measurements of a plurality of multi-color images and generating, using measurement results, multi-color calibration data, wherein each of the plurality of multi-color images is formed using a plurality of color recording materials by the image forming unit on a sheet of the sheet type selected by the selection unit and at least one multi-color image of the plurality of multi-color images is a chromatic color image which is formed using only the first color recording material and the second color recording material.

11. The image processing apparatus according to claim 10, wherein the plurality of monochromatic images formed using the first color recording material is different in density and the plurality of monochromatic images formed using the second color recording material is different in density.

12. The image processing apparatus according to claim 10,
wherein the multi-color image is formed by superposition of a plurality of color recording materials.

13. The image processing apparatus according to claim 10,
wherein the first monochromatic color images are formed with different amounts of the first color recording material and the second monochromatic color images are formed with different amounts of the second color recording material.

14. An image processing method comprising:
selecting a sheet type via an operation unit;
first processing to execute a first calibration, the first calibration being executed by measurements of a plurality of monochromatic images includig monochromatic images of a first color and monochromatic images of a second color generating, using measurement results, monochromatic calibration data, where each of the monochromatic images of the first color is formed on a sheet of the selected sheet type, each of the monochromatic images of the second color is formed using only a second color recording material on the sheet; and
second processing to execute a second calibration using the selected sheet, the second calibration being executed by measurements of a plurality of multi-color images and generating, using measurement results, multi-color calibration data, wherein each of the plurality of multi-color images is formed using a plurality of color recording materials on a sheet of the selected sheet type and at least one multi-color image of the pluraltiy of multi-color images is a chromatic color image which is formed using only the first color recording material and the second color recording material.

* * * * *